United States Patent
Ikeda

(10) Patent No.: US 12,360,994 B2
(45) Date of Patent: Jul. 15, 2025

(54) INFORMATION PROCESSING APPARATUS, INFORMATION PROCESSING METHOD, AND RECORDING MEDIUM

(71) Applicant: NEC Corporation, Tokyo (JP)

(72) Inventor: Satoshi Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 65 days.

(21) Appl. No.: 18/022,618

(22) PCT Filed: Sep. 29, 2020

(86) PCT No.: PCT/JP2020/036907
§ 371 (c)(1),
(2) Date: Sep. 25, 2023

(87) PCT Pub. No.: WO2022/070256
PCT Pub. Date: Apr. 7, 2022

(65) Prior Publication Data
US 2024/0004878 A1  Jan. 4, 2024

(51) Int. Cl.
*G06F 16/2453* (2019.01)
*G06F 17/16* (2006.01)

(52) U.S. Cl.
CPC ........ *G06F 16/24534* (2019.01); *G06F 17/16* (2013.01)

(58) Field of Classification Search
CPC ............................ G06F 16/24534; G06F 17/16
See application file for complete search history.

(56) References Cited

U.S. PATENT DOCUMENTS

| 2004/0068493 A1 | 4/2004 | Kobayashi et al. |
| 2006/0153457 A1 | 7/2006 | Nakamura et al. |

(Continued)

FOREIGN PATENT DOCUMENTS

| EP | 1092217 A1 * | 4/2001 | .............. G09G 1/07 |
| JP | 2003-141077 A | 5/2003 | |

(Continued)

OTHER PUBLICATIONS

International Search Report for PCT Application No. PCT/JP2020/036907, mailed on Nov. 2, 2020.

*Primary Examiner* — Sherief Badawi
*Assistant Examiner* — Earl Elias

(57) ABSTRACT

An information processing apparatus 4 includes: a transformation unit 423 configured to transform a plurality of tuples of feature vector data XV in a presentation space into a plurality of tuples of latent vector data ZV in a latent space; an extraction unit 423 configured to extract, based on the plurality of tuples of latent vector data, feature vector data having a shorter distance from query data DQ in the latent space than the other feature vector data, as neighbor data $DN_i$ from among the plurality of tuples of feature vector data; a generation unit 424 configured to generate, based on the neighbor data, a local model LM that outputs an estimation value $dp_i$ of a latent distance $d_i$ when difference information $V_i$ is inputted, the latent distance being a distance between the query data and the neighbor data in the latent space, the difference information being related to a difference, for each element of the features, between the query data and the neighbor data in the presentation space; and a calculation unit 425 configured to calculate, based on the local model and the difference information, an element contribution degree $c_{i,f}$ representing a magnitude of an effect that each element of the features of the neighbor data exerts on the latent distance.

10 Claims, 11 Drawing Sheets

(56) References Cited

U.S. PATENT DOCUMENTS

| | | | |
|---|---|---|---|
| 2013/0101186 A1* | 4/2013 | Walch | G06V 40/1359 |
| | | | 382/125 |
| 2016/0180196 A1 | 6/2016 | Taylor | |
| 2017/0026390 A1* | 1/2017 | Sofka | H04L 63/1416 |
| 2017/0228641 A1 | 8/2017 | Sohn | |
| 2017/0237904 A1* | 8/2017 | Takahashi | H04N 23/683 |
| | | | 348/208.1 |
| 2019/0087384 A1 | 3/2019 | Goto et al. | |
| 2021/0295207 A1* | 9/2021 | Neumann | G16H 10/20 |
| 2022/0245379 A1* | 8/2022 | Yamaguchi | G06F 18/214 |

FOREIGN PATENT DOCUMENTS

| | | | | |
|---|---|---|---|---|
| JP | 2004-127055 A | 4/2004 | | |
| JP | 2006-190191 A | 7/2006 | | |
| JP | 2007-183927 A | 7/2007 | | |
| JP | 2012-073852 A | 4/2012 | | |
| JP | 2019-056983 A | 4/2019 | | |
| JP | 2019-509551 A | 4/2019 | | |
| WO | 2013/129580 A1 | 9/2013 | | |
| WO | WO-2022225516 A1 * | 10/2022 | | G06N 3/084 |

\* cited by examiner

411

| | CLIENT INFO | SERVER INFO | COMMUNICATION DATA AND TIME INFO | METHOD INFO | REQUEST PATH INFO | RECEPTION SIZE INFO | TRANSMISSION SIZE INFO |
|---|---|---|---|---|---|---|---|
| 4111 | C1 | S1 | 2019/01/01 10:00 | GET | /index.html | 2000 | 0 |
| | C1 | S1 | 2019/01/01 10:01 | GET | /main.css | 3000 | 0 |
| | C1 | S1 | 2019/01/01 10:02 | GET | /title.png | 10000 | 0 |
| | C2 | S2 | 2019/01/01 11:00 | POST | / | 200 | 1000 |
| | C2 | S2 | 2019/01/01 11:00 | POST | / | 200 | 1000 |
| | C2 | S2 | 2019/01/01 12:00 | POST | / | 200 | 1000 |
| | ⋮ | ⋮ | ⋮ | ⋮ | ⋮ | ⋮ | ⋮ |

| | DATA IDENTIFIER | | | FEATURE VECTOR XV | |
|---|---|---|---|---|---|
| | CLIENT | SERVER | COMMUNICATION DATA | | |
| DV ($DV_1$) | C1 | S1 | 2019/01/01 | [0.1, 0.2, 0.5, 0.0, ···] | $XV_1$ |
| DV ($DV_2$) | C1 | S1 | 2019/01/02 | [0.1, 0.4, 0.5, 0.0, ···] | $XV_2$ |
| DV ($DV_3$) | C2 | S1 | 2019/01/01 | [0.1, 0.2, 0.5, 0.0, ···] | $XV_3$ |
| DV ($DV_4$) | C2 | S2 | 2019/01/02 | [0.3, 0.2, 0.4, 0.1, ···] | $XV_4$ |
| DV ($DV_5$) | C2 | S2 | 2019/01/04 | [0.3, 0.1, 0.4, 0.0, ···] | $XV_5$ |
| | ⋮ | ⋮ | ⋮ | ⋮ | |

FIG. 4

| DATA DESIGNATION INFORAMTION | | | | | | LABEL INFO |
|---|---|---|---|---|---|---|
| DATA IDENTIFIER | | | DATA IDENTIFIER | | | |
| CLIENT | SERVER | COMMUNIC ATION DATA AND TIME | CLIENT | SERVER | COMMUNIC ATION DATA AND TIME | |
| C1 | S1 | 2019/01/01 | C2 | S2 | 2019/01/01 | 0 |
| C2 | S2 | 2019/01/02 | C2 | S2 | 2019/01/04 | 1 |
| ⋮ | ⋮ | ⋮ | ⋮ | ⋮ | ⋮ | ⋮ |

| | | | NEIGHBOR DATA $DN_i$ | | | |
|---|---|---|---|---|---|---|
| | | | $DN_1$ (i=1) | $DN_2$ (i=2) | $DN_3$ (i=3) | ... |
| ELEMENT CONTRIBUTION DEGREE $c_{i,f}$ | $c_{i,1}$ | MINIMUM RECEPTION SIZE (f=1) | 0.2 | 0.4 | 0.4 | ... |
| | $c_{i,2}$ | MAXIMUM RECEPTION SIZE (f=2) | 0.2 | 0.35 | 0.35 | ... |
| | $c_{i,3}$ | MINIMUM TRANSMISSION SIZE (f=3) | 0.25 | 0.15 | 0.10 | ... |
| | $c_{i,4}$ | MAXIMUM TRANSMISSION SIZE (f=4) | 0.25 | 0.05 | 0.05 | ... |
| | $c_{i,5}$ | TOTAL SIZE (f=5) | 0.1 | 0 | 0 | ... |
| | $c_{i,6}$ | METHOD(GET) (f=6) | 0 | 0.05 | 0.05 | ... |
| | $c_{i,7}$ | METHOD (POST) (f=7) | 0 | 0 | 0 | ... |
| | $c_{i,8}$ | METHOD (OTHER) (f=8) | 0 | 0 | 0 | ... |

FIG. 9

| | | BELONGING PROPORTION $b_{g,f}$ | | |
|---|---|---|---|---|
| | | RECEPTION SIZE (g=1) | TRANSMISSION SIZE (g=2) | METHOD (g=3) |
| VECTOR COMPONENT | MINIMUM RECEPTION SIZE (f=1) | 1 | 0 | 0 |
| | MAXIMUM RECEPTION SIZE (f=2) | 1 | 0 | 0 |
| | MINIMUM TRANSMISSION SIZE (f=3) | 0 | 1 | 0 |
| | MAXIMUM TRANSMISSION SIZE (f=4) | 0 | 1 | 0 |
| | TOTAL SIZE (f=5) | 0.5 | 0.5 | 0 |
| | METHOD (GET) (f=6) | 0 | 0 | 1 |
| | METHOD (POST) (f=7) | 0 | 0 | 1 |
| | METHOD (OTHER) (f=8) | 0 | 0 | 1 |

FIG. 10

| CLIENT INFO | SERVER INFO | COMMUNICATION DATE AND TIME INFO | METHOD INFO | REQUEST PATH INFO | RECEPTION SIZE INFO | TRANSMISSION SIZE INFO |
|---|---|---|---|---|---|---|
| C1 | S1 | 2019/01/01 10:00 | GET | /index.html | 2000 | 0 |
| C1 | S1 | 2019/01/01 10:01 | GET | /main.css | 3000 | 0 |
| C1 | S1 | 2019/01/01 10:02 | GET | /title.png | 10000 | 0 |
| GROUP CONTRIBUTION DEGREE $e_{i,f}(e_{i,1}, e_{i,2}, e_{i,3})$ | | | 0 | – | 0.5 | 0.5 |

FIG. 11A

| CLIENT INFO | SERVER INFO | COMMUNICATION DATE AND TIME INFO | METHOD INFO | REQUEST PATH INFO | RECEPTION SIZE INFO | TRANSMISSION SIZE INFO |
|---|---|---|---|---|---|---|
| C1 | S1 | 2019/01/01 10:00 | GET | /index.html | 2000 | 0 |
| C1 | S1 | 2019/01/01 10:01 | GET | /main.css | 3000 | 0 |
| C1 | S1 | 2019/01/01 10:02 | GET | /title.png | 10000 | 0 |

FIG. 11B

INFORMATION PROCESSING APPARATUS, INFORMATION PROCESSING METHOD, AND RECORDING MEDIUM

TECHNICAL FIELD

The present disclosure relates to a technical field of an information processing apparatus, an information processing method, and a recording medium that are able to calculate information related to a factor exerting an effect on a distance between two tuples of data in a vector space.

BACKGROUND ART

As an example of a method of calculating a distance between two tuples of data (specifically, a distance between two feature vectors respectively representing features of the two tuples of data), a method using distance metric learning (in other words, metric learning) has been known (see Patent Literature 1). Metric learning is a method for generating a transformation model that can transform a feature vector of each tuple of data in such a manner that a distance between two or more tuples of similar data becomes short and a distance between two or more tuples of dissimilar data becomes long in a vector space. In such a case, two feature vectors respectively representing features of two tuples of data are transformed by the transformation model, and a distance between the two feature vectors after transformed is calculated as a distance between the two tuples of data.

In addition, Patent Literatures 2 to 7 can be listed as prior art references related to the invention of the present application.

CITATION LIST

Patent Literature

Patent Literature 1
Japanese Translation of PCT International Application Publication No. 2019-509551
Patent Literature 2
Japanese Patent Laid-Open No. 2003-141077 A
Patent Literature 3
Japanese Patent Laid-Open No. 2004-127055 A
Patent Literature 4
Japanese Patent Laid-Open No. 2007-183927 A
Patent Literature 5
Japanese Patent Laid-Open No. 2012-073852 A
Patent Literature 6
Japanese Patent Laid-Open No. 2019-056983 A
Patent Literature 7
International Publication No. WO 2013/129580 Pamphlet

SUMMARY

Technical Problem

A transformation model generated through metric learning is, in general, a black box model in which a process of transforming a feature vector cannot be understood by a user. Consequently, the user cannot understand a factor exerting an effect on a distance between two tuples of data. Accordingly, from a viewpoint of enhancing user convenience, it is desired to calculate information related to a factor exerting an effect on a distance between two tuples of data.

An example object of the present disclosure is to provide an information processing apparatus, an information processing method, and a recording medium that are able to solve the above-described technical problem. As an example, an example object of the present disclosure is to provide an information processing apparatus, an information processing method, and a recording medium that are able to calculate information related to a factor exerting an effect on a distance between two tuples of data.

Solution to Problem

One aspect of an information processing apparatus includes a transformation unit configured to transform a plurality of tuples of feature vector data into a plurality of tuples of latent vector data, the plurality of tuples of feature vector data represents features of a plurality of sample data groups, respectively, in a presentation space, the plurality of tuples of latent vector data represents features of the plurality of sample data groups, respectively, in a latent space that is different from the presentation space; an extraction unit configured to extract, based on the plurality of tuples of latent vector data, at least one tuple of feature vector data as neighbor data from among the plurality of tuples of feature vector data, the at least one tuple of feature vector data has a shorter distance from desired query data in the latent space than the other tuples of feature vector data; a generation unit configured to generate, based on the neighbor data, a local model that outputs an estimation value of a latent distance when difference information is inputted thereto, the latent distance is a distance between the query data and the neighbor data in the latent space, the difference information is related to a difference, for each element of the features, between the query data and the neighbor data in the presentation space; and a calculation unit configured to calculate, based on the local model and the difference information, an element contribution degree represents a magnitude of an effect that each element of the features of the neighbor data exerts on the latent distance.

One aspect of an information processing method includes: transforming a plurality of tuples of feature vector data into a plurality of tuples of latent vector data, the plurality of tuples of feature vector data represents features of a plurality of sample data groups, respectively, in a presentation space, the plurality of tuples of latent vector data represents features of the plurality of sample data groups, respectively, in a latent space that is different from the presentation space; extracting, based on the plurality of tuples of latent vector data, at least one tuple of feature vector data as neighbor data from among the plurality of tuples of feature vector data, the at least one tuple of feature vector data has a shorter distance from desired query data in the latent space than the other tuples of feature vector data; generating, based on the neighbor data, a local model that outputs an estimation value of a latent distance when difference information is inputted thereto, the latent distance is a distance between the query data and the neighbor data in the latent space, the difference information is related to a difference, for each element of the features, between the query data and the neighbor data in the presentation space; and calculating, based on the local model and the difference information, an element contribution degree representing a magnitude of an effect that each element of the features of the neighbor data exerts on the latent distance.

One aspect of a recording medium is a recording medium storing a computer program that causes a computer to execute an information processing method, the information processing method includes: transforming a plurality of tuples of feature vector data into a plurality of tuples of latent vector data, the plurality of tuples of feature vector data represents features of a plurality of sample data groups, respectively, in a presentation space, the plurality of tuples of latent vector data represents features of the plurality of sample data groups, respectively, in a latent space that is different from the presentation space; extracting, based on the plurality of tuples of latent vector data, at least one tuple of feature vector data as neighbor data from among the plurality of tuples of feature vector data, the at least one tuple of feature vector data has a shorter distance from desired query data in the latent space than the other tuples of feature vector data; generating, based on the neighbor data, a local model that outputs an estimation value of a latent distance when difference information is inputted thereto, the latent distance is a distance between the query data and the neighbor data in the latent space, the difference information is related to a difference, for each element of the features, between the query data and the neighbor data in the presentation space; and calculating, based on the local model and the difference information, an element contribution degree represents a magnitude of an effect that each element of the features of the neighbor data exerts on the latent distance.

Effect

According to the respective aspects of the information processing apparatus, the information processing method, and the recording medium described above, it is possible to calculate information related to a factor exerting an effect on a distance between two tuples of data.

BRIEF DESCRIPTION OF DRAWINGS

FIG. 3 is a data structure diagram illustrating a data structure of a proxy log DB in the present example embodiment.

FIG. 4 is a data structure diagram illustrating a data structure of a feature dataset in the present example embodiment.

FIG. 9 is a plan view illustrating a display example of element contribution degrees.

FIG. 10 is a table illustrating belonging proportions in which vector components belong to feature groups.

FIG. 11 is a plan view illustrating display examples of group contribution degrees.

DESCRIPTION OF EXAMPLE EMBODIMENTS

Hereinafter, an example embodiment of an information processing apparatus, an information processing method, and a recording medium is described with reference to the drawings. In the following, the example embodiment of the information processing apparatus, the information processing method, and the recording medium is described by using a communication system SYS to which the example embodiment of the information processing apparatus, the information processing method, and the recording medium is applied.

Figure 1:
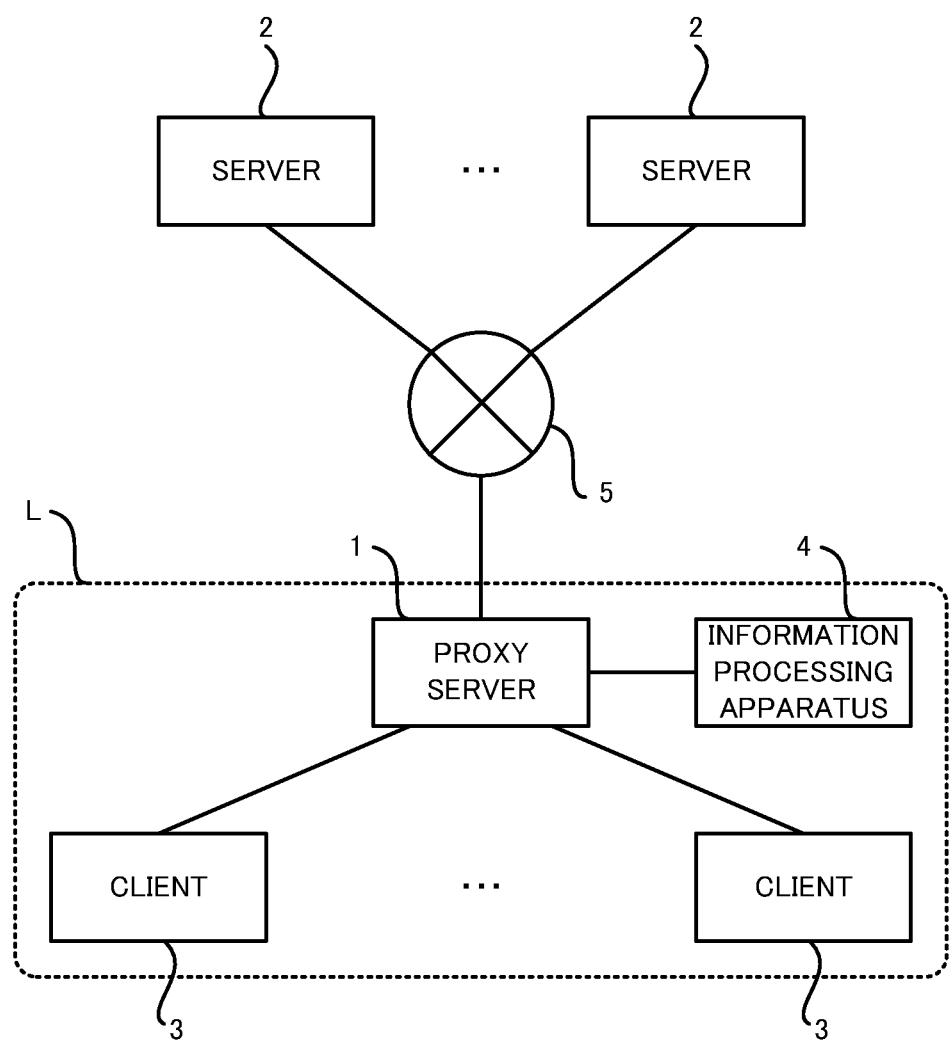
FIG. 1 is a block diagram illustrating a configuration of a communication system according to an example embodiment.

(1) Configuration of Communication System SYS
(1-1) Entire Configuration of Communication System SYS First, an entire configuration of the communication system SYS according to the present example embodiment is described with reference to FIG. 1. FIG. 1 is a block diagram illustrating the entire configuration of the communication system SYS according to the present example embodiment.

As illustrated in FIG. 1, the communication system SYS includes a proxy server 1, a plurality of clients 2, a plurality of servers 3, and an information processing apparatus 4. However, the communication system SYS may include a single client 2. The communication system SYS may include a single server 3. The proxy server 1 and each of the plurality of servers 3 can communicate via a network 5. The network 5 may include a wired network, or may include a wireless network.

The proxy server 1 is an apparatus that relays communication between the clients 2 and the servers 3. For example, the proxy server 1 may transmit, via the network 5, a request acquired from a client 2 to a server 3 designated in the acquired request. The request may include, for example, an HTTP (Hyper Text Transfer Protocol) request. However, the request is not limited to an HTTP request. For example, the proxy server 1 may transmit a response acquired via the network 5 from a server 3 to a client 2 designated in the response. The response may include, for example, an HTTP response. However, the response is not limited to an HTTP response.

A system including the proxy server 1 and the plurality of clients 2 may be referred as a local system L. In such a case, it can also be said that the proxy server 1 is disposed at a boundary between the local system L and a wide area network outside of the local system L. It can also be said that the proxy server 1 relays communication between the local system L and the wide area network.

Each client 2 communicates with each server 3 via the proxy server 1. For example, a client 2 may transmit desired data to a server 3 via the proxy server 1. For example, a client 2 may receive desired data from a server 3 via the proxy server 1.

Each server 3 communicates with each client 2 via the proxy server 1. For example, a server 3 may transmit desired data to a client 2 via the proxy server 1. For example, a server 3 may receive desired data from a client 2 via the proxy server 1. The servers 3 are, for example, HTTP servers. However, the servers 3 may be other servers than the HTTP servers.

The information processing apparatus 4 performs threat detection operation for detecting a threat that has already intruded in the local system L via the network 5. Hereinafter, a configuration of the information processing apparatus 4 that performs such threat detection operation is further described.

(1-2) Configuration of Information Processing Apparatus 4

Figure 2:
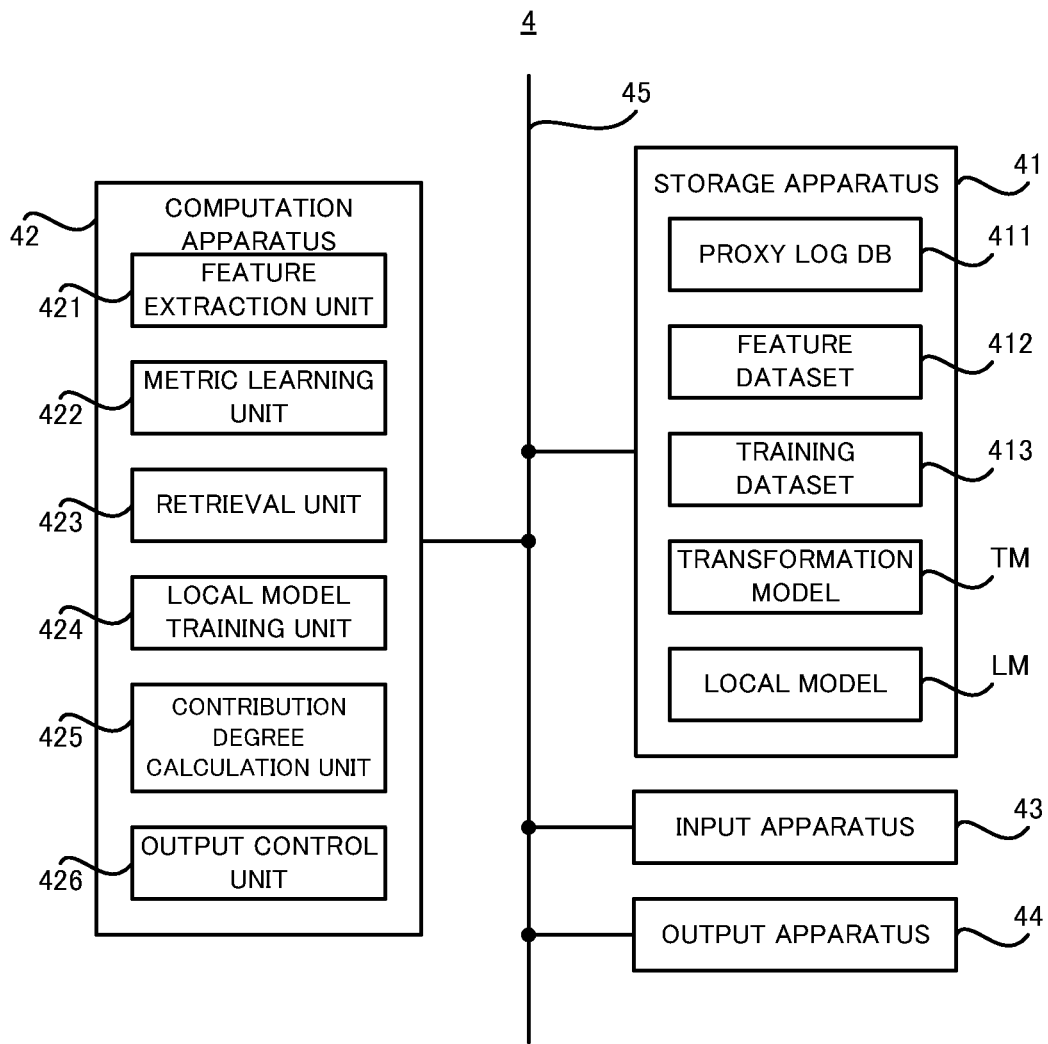
FIG. 2 is a block diagram illustrating a configuration of an information processing apparatus in the present example embodiment.

The configuration of the information processing apparatus 4 in the present example embodiment is described with reference to FIG. 2. FIG. 2 is a block diagram illustrating the configuration of the information processing apparatus 4 in the present example embodiment.

As illustrated in FIG. 2, the information processing apparatus 4 includes a storage apparatus 41 and a computation apparatus 42. Further, the information processing apparatus 4 may include an input apparatus 43 and an output apparatus 44. However, the information processing apparatus 4 may omit to include at least one of the input apparatus 43 and the output apparatus 44. The storage apparatus 41, the computation apparatus 42, the input apparatus 43, and the output apparatus 44 may be connected through a data bus 45.

The storage apparatus 41 can store desired data. For example, the storage apparatus 41 may temporarily store a computer program that is executed by the computation apparatus 42. The storage apparatus 41 may temporarily store data that is temporarily used by the computation apparatus 42 when the computation apparatus 42 executes the computer program. The storage apparatus 41 may store data that is retained by the information processing apparatus 4 for a long time. Note that the storage apparatus 41 may include at least one of a RAM (Random Access Memory), a ROM (Read Only Memory), a hard disk apparatus, a magneto-optical disk apparatus, an SSD (Solid State Drive), and a disk array apparatus. In other words, the storage apparatus 41 may include a non-transitory recording medium.

In the present example embodiment, the storage apparatus 41 stores data that the information processing apparatus 4 uses to perform the threat detection operation. As examples of the data that the information processing apparatus 4 uses to perform the threat detection operation, FIG. 1 presents a proxy log DB (Database) 411, a feature dataset 412, a training dataset 413, a transformation model TM, and a local model LM. In other words, FIG. 4 illustrates an example in which the storage apparatus 41 stores the proxy log DB 411, the feature dataset 412, the training dataset 413, the transformation model TM, and the local model LM.

The proxy log DB 411 stores a plurality of tuples of proxy log data 4111 (see FIG. 3). The proxy log data 4111 is log data indicating an archival record of a communication relayed by the proxy server 1 (that is, a communication between a client 2 and a server 3). A data structure of the proxy log DB 411 storing the plurality of tuples of such proxy log data 4111 is illustrated in FIG. 3. As illustrated in FIG. 3, the proxy log data 4111 may include, for example, (i) log information (client information) indicating a client 2 that communicated with a server 3, (ii) log information (server information) indicating the server 3 that communicated with the client 2, (iii) log information (communication date and time information) indicating a date and time when the client 2 and the server 3 communicated, (iv) log information (method information) indicating a method that the client 2 used when communicating with the server 3, (v) log information (request path information) indicating a path (request path) designated in a request that the client 2 transmitted to the server 3, (vi) log information (reception size information) indicating a size of data that the client 2 received from the server 3, and (vii) log information (transmission size information) indicting a size of data that the client 2 transmitted to the server 3. However, the proxy log data 4111 may omit to include at least one of the plurality of types of log information illustrated in FIG. 3. The proxy log data 4111 may include other log information that is different from the plurality of types of log information illustrated in FIG. 3. Note that the proxy log data 4111 may be referred to as sample data. The log information included in the proxy log data 4111 may be referred to as sample information.

The feature dataset 412, the training dataset 413, the transformation model TM, and the local model LM will be described in detail later.

Referring again to FIG. 2, the computation apparatus 42 includes, for example, at least one of a CPU (Central Processing Unit), a GPU (Graphical Processing Unit), and an FPGA (Field Programmable Gate Array). The computation apparatus 42 reads a computer program. For example, the computation apparatus 42 may read the computer program stored in the storage apparatus 41. For example, the computation apparatus 42 may read the computer program stored in a computer-readable non-transitory recording medium, by using an undepicted recording medium reading apparatus. The computation apparatus 42 may acquire (that is, may download or may read) the computer program from an undepicted apparatus disposed outside of the information processing apparatus 4, via the input apparatus 43 that can function as a communication apparatus. The computation apparatus 42 executes the read computer program. As a result, a logical functional block for performing operation to be performed by the information processing apparatus 4 (for example, the above-mentioned threat detection operation) is implemented in the computation apparatus 42. In other words, the computation apparatus 42 can function as a controller for implementing the logical functional block for performing the operation to be performed by the information processing apparatus 4.

FIG. 2 illustrates examples of the logical functional block that is implemented within the computation apparatus 42 in order to perform the threat detection operation. As illustrated in FIG. 2, a feature extraction unit 421, a metric learning unit 422, a retrieval unit 423 that is one specific example of each of a "transformation unit" and an "extraction unit", a local model training unit 424 that is one specific example of a "generation unit", a contribution degree calculation unit 425 that is one specific example of a "calculation unit", and an output control unit 426 are implemented in the computation apparatus 42.

The feature extraction unit 421 extracts, from the proxy log DB 411, a plurality of tuples of (or at least one tuple of) proxy log data 4111 that is classified into the same log data group, based on a predetermined log classification criterion. The predetermined log classification criterion may include such a log classification criterion that a plurality of tuples of proxy log data 4111 having the same client information, having the same server information, and having the communication date and time information that meets a predetermined date and time reference is classified into the same log data group. The plurality of tuples of proxy log data 4111 that meets the predetermined date and time reference may include a plurality of tuples of proxy log data 4111 in which the communication date and time information indicates the same communication dates. The plurality of tuples of proxy log data 4111 that meets the predetermined date and time reference may include a plurality of tuples of proxy log data 4111 in which the communication date and time information indicates communication times (or communication dates and times) that are consecutive with an interval less than a predetermined value therebetween. Note that tuples of proxy log data 4111 that are classified into the same log data group may also be referred to as a sample data group. In such a case, for example, the feature extraction unit 421 may extract, from the proxy log DB 411 illustrated in FIG. 3, each of three tuples of proxy log data 4111 that indicate archival records of a communication performed on Jan. 1, 2019 between a client 2 corresponding to an identifier of C1 and a server 3 corresponding to an identifier of S1, as proxy log data 4111 classified into a first log data group. Similarly, for example, the feature extraction unit 421 may extract, from the proxy log DB 411 illustrated in FIG. 3, each of three tuples of proxy log data 4111 that indicate archival records of a communication performed on Jan. 1, 2019 between a client 2 corresponding to an identifier of C2 and a server 3 corresponding to an identifier of S2, as proxy log data 4111 classified into a second log data group that is different from the first log data group.

The feature extraction unit 421 further generates a feature vector XV that indicates features of the plurality of tuples of proxy log data 4111 extracted (that is, the plurality of tuples of proxy log data 4111 classified into the same log data group). The feature extraction unit 421 generates one feature vector XV from the plurality of tuples of proxy log data 4111 classified into the same log data group. Accordingly, the feature extraction unit 421 generates as many feature vectors XV as the number of log data groups. In the following description, an example is described in which the number of log data groups is K (K is a constant indicating an integer equal to or more than one) and the feature extraction unit 421 generates K feature vectors XV (hereinafter, the K feature vectors XV are referred to as "feature vectors $XV_1$ to $XV_K$ with indexes" represented by respective subscripts). Moreover, in the following description, a feature vector XV generated from one log data group corresponding to an index of v (v is a variable that satisfies 1≤v≤K), among the K log data groups, is referred to as feature vector $XV_v$. Note that the feature vector XV may also be referred to as feature vector data XV. The feature extraction unit 421 may generate the feature vector XV by analyzing the plurality of tuples of proxy log data 4111 extracted. The feature extraction unit 421 may generate the feature vector XV, for example, by performing arithmetic processing of calculating a statistic of the plurality of tuples of proxy log data 4111.

For example, the feature vector XV may include an element indicating a feature (that is, a vector component; hereinafter, the same applies) related to the transmission size information. The feature related to the transmission size information may include a feature related to a statistic (for example, at least one of a minimum value, a maximum value, a mean value, a variance, a mean value, and the like) of a transmission size indicated by the transmission size information. For example, the feature vector XV may include an element indicating a feature related to the reception size information. The feature related to the reception size information may include a feature related to a statistic (for example, at least one of a minimum value, a maximum value, a mean value, a variance, a total value, and the like) of a reception size indicated by the reception size information. For example, the feature vector XV may include an element indicating a feature related to the path information. The feature related to the path information may include a feature of a statistic (for example, at least one of a minimum value, a maximum value, a mean value, a variance, and the like) of a data length of a request path indicated by the path information. The feature related to the path information may include a feature related to frequency of an extension to a request path indicated by the path information (for example, frequency of requests sorted by extension). For example, the feature vector XV may include an element indicating a feature related to the method information. The feature related to the method information may include a feature related to frequency of a method indicated by the method information (for example, at least one of a proportion of GET method, a proportion of POST method, a proportion of other methods, and the like). For example, the feature vector XV may include an element indicating a feature related to dispersion of access times (for example, a proportion of requests transmitted in each unit time period (for example, one hour)). For example, the feature vector XV may include an element indicating a feature related to the number of times a request is transmitted. Note that when header information is included in the proxy log data 4111, for example, the feature vector XV may include an element indicating a feature related to the header information.

Each feature vector XV generated by the feature extraction unit 421 is stored in the storage apparatus 41, as at least a part of the feature dataset 412. An example of a data structure of the feature dataset 412 is illustrated in FIG. 4. As described above, the feature extraction unit 421 generates one feature vector XV from a plurality of tuples of proxy log data 4111 classified into the same log data group. Accordingly, the storage apparatus 41 may store each feature vector XV generated by the feature extraction unit 421, as feature data DV in which the feature vector XV is associated with a data identifier for identifying a log data group corresponding to the feature vector XV. In such a case, as illustrated in FIG. 4, the feature dataset 412 includes as many tuples of feature data DV (that is, feature vectors XV) as the number of log data groups into which the proxy log data 4111 is classified based on the predetermined log classification criterion. In other words, the feature dataset 412 may include K tuples of feature data DV (hereinafter, the K tuples of feature data DV are referred to as "feature data $DV_1$ to $DV_K$" with indexes represented by respective subscripts). Note that in the following description, feature data DV including a feature vector $XV_v$ is referred to as feature data $DV_v$. In the above description, the predetermined log classification criterion includes such a log classification criterion that a plurality of tuples of proxy log data 4111 having the same client information, the same server information, and the same communication date and time information is classified into the same log data group. In such a case, as illustrated in FIG. 4, the storage apparatus 41 may store each generated feature vector XV as feature data DV in which the feature vector XV is associated with data identifiers that uniquely specify client information, server information, and communication date and time information, respectively.

The metric learning unit 422 generates the transformation model TM that is used to transform the feature vector XV. The feature vector XV indicates features of proxy log data 4111 within a presentation space (that is, a vector space). The transformation model TM is a model that transforms such a feature vector XV representing features of proxy log data 4111 within the presentation space, into a latent vector ZV representing the features of the proxy log data 4111 within a latent space that is a different vector space from the presentation space. Since the K feature vectors $XV_1$ to $XV_K$ are generated as described above, the transformation model TM may transform the K feature vectors $XV_1$ to $XV_K$ into K latent vectors $ZV_1$ to $ZV_K$, respectively. In other words, the transformation model TM may transform a feature vector $XV_v$ into a latent vector $ZV_v$. Note that the latent vector ZV may also be referred to as latent vector data ZV. The transformation model TM generated by the metric learning unit 422 is stored in, for example, the storage apparatus 41. Note that operation of generating the transformation model TM will be described in detail later with reference to FIG. 5 and others.

Typically, it is preferable that the number of elements corresponding to vector components of the latent vector ZV (that is, the number of elements corresponding to features represented by the latent vector ZV, and the number of dimensions of the latent space) be smaller than the number of elements corresponding to vector components of the feature vector XV (that is, the number of elements corresponding to features represented by the feature vector XV, and the number of dimensions of the presentation space). Accordingly, the latent vector ZV may be referred to as lower-dimensional vector, and the feature vector XV may be referred to as higher-dimensional vector. When the feature vector XV is transformed into the latent vector ZV that is in a lower dimension than the feature vector XV as described above, there is a merit that a human sensation is relatively strongly reflected in the threat detection operation (that is, a threat is detected after a human sensation is relatively strongly considered), compared to a case where the feature vector XV is not transformed into the latent vector ZV. However, the number of elements corresponding to the vector components of the latent vector ZV may be the same as the number of elements corresponding to the vector components of the feature vector XV. The number of elements corresponding to the vector components of the latent vector ZV may be larger than the number of elements corresponding to the vector components of the feature vector XV.

Based on query data DQ that specifies a threat (hereinafter, referred to as "detection-target threat") desired to be detected through the threat detection operation, the retrieval unit 423 retrieves, from the feature dataset 412, at least one tuple of feature data DV having a high degree of similarity to the query data DQ, compared to the other tuples of feature data DV. In the present example embodiment, an example is described in which a distance between the query data DQ and the feature data DV in the latent space is used for an indicator value that indicates a degree of similarity between the query data DQ and the feature data DV. Note that the distance between the query data DQ and the feature data DV in the latent space refers to a distance between a latent vector ZQ obtained by transforming a feature vector XQ indicated by the query data DQ (that is, a feature vector representing features of the detection-target threat) by using the transformation model TM, and the latent vector ZV obtained by transforming the feature vector XV indicated by the feature data DV by using the transformation model TM. Accordingly, in the present example embodiment, the retrieval unit 423 retrieves, from the feature dataset 412, at least one tuple of feature data DV having a short distance from the query data DQ in the latent space, compared to the other tuples of feature data DV.

The query data DQ may include the feature vector XQ indicating the features of the detection-target threat. In such a case, it is preferable that the number of dimensions of the feature vector XQ of the query data DQ be equal to the number of dimensions of the feature vector XV of the feature data DV. In other words, when the number of dimensions of the feature vector XV is F (where F is a constant indicating an integer equal to or more than one), it is preferable that the number of dimensions of the feature vector XQ be also F. In particular, it is preferable that types of the F features respectively represented by the F vector components of the feature vector XV be the same as types of the F features respectively represented by the F vector components of the feature vector XQ. For example, when the feature vector XV includes a vector component representing a feature related to the reception size and a vector component representing a feature related to the transmission size, it is preferable that the feature vector XQ also includes a vector component representing a feature related to the reception size and a vector component representing a feature related to the transmission size.

In the present example embodiment, an example is described in which the retrieval unit 423 retrieves, from the feature dataset 412, n (where n is a constant indicating an integer that satisfies $1 \leq n \leq K$ (total number of the tuples of feature data DV)) tuples of feature data DV having a short distance from the query data DQ in the latent space, compared to the other tuples of feature data DV. In such a case, the retrieval unit 423 extracts the n tuples of feature data DV retrieved, as n tuples of neighbor data DN, respectively (hereinafter, the n tuples of neighbor data DN are referred to as "neighbor data $DN_1$ to $DN_n$", respectively).

Neighbor data $DN_i$ (where i is a variable indicating an integer that satisfies $1 \leq i \leq n$) corresponds to data located near the query data DQ in the latent space. In other words, the neighbor data $DN_i$ corresponds to the feature data DV representing features of proxy log data 4111 indicating a trace of a threat that is the same as or a similar to the detection-target threat specified by the query data DQ. Accordingly, when the neighbor data $DN_i$ is detected, it is supposed that the threat that is the same as or similar to the detection-target threat may have already intruded in the local system L. Accordingly, the extracted neighbor data $DN_i$ (or proxy log data 4111 corresponding to the neighbor data $DN_i$) may be further analyzed in order to determine whether or not the threat actually intruded in the local system L.

The local model training unit 424 generates the local model LM, based on the neighbor data $DN_1$ to $DN_n$. The local model LM is a model that outputs an estimation value $dp_i$ of a distance $d_i$ between the query data DQ and the neighbor data $DN_i$ in the latent space when difference information $V_i$ related to a difference between the query data DQ and the neighbor data $DN_i$ in the presentation space is inputted. Note that operation of generating the local model LM will be described in detail later with reference to FIG. 7 and others.

For example, the difference information $V_i$ may include difference information $v_{i,f}$ that indicates a difference between the query data DQ and the neighbor data $DN_i$, for each vector component (that is, for each element indicating (each type of) a feature corresponding to a vector component). In other words, the difference information $V_i$ may include the difference information $v_{i,f}$ that indicates a difference between the feature vector XQ of the query data DQ and a feature vector $XN_i$ of the neighbor data $DN_i$, for each vector component. Note that when the f-th (where f is a variable indicating an integer that satisfies $1 \leq f \leq F$) vector component of the feature vector $XN_i$ (that is, a feature corresponding to the f-th element of the neighbor data $DN_i$) is $xn_{i,f}$, and when the f-th vector component of the feature vector XQ is $xq_f$, the difference information $v_{i,f}$ may be a value based on a difference between the vector component $xn_{i,f}$ and the vector component $xq_f$. For example, an absolute value of the difference between the vector component $xn_{i,f}$ and the vector component $xq_f$ ($=|xq_f - xn_{i,f}|$) or a square of the difference between the vector component $xn_{i,f}$ and the vector component $xq_f$ ($=(xq_f - xn_{i,f})^2$) may be used for the difference information $v_{i,f}$. As described above, since the number of dimensions of each of the feature vectors XQ and $XN_i$ is F, the difference information $V_i$ may include difference information $v_{i,1}$, difference information $v_{i,2}$, ..., difference information $v_{i,f}$, ..., and difference information $v_{i,F}$.

The contribution degree calculation unit 425 calculates an element contribution degree c representing a magnitude of an effect that each vector component of a feature vector of certain neighbor data exerts on a distance between certain query data and the certain neighbor data in the latent space. Specifically, the contribution degree calculation unit 425 calculates the element contribution degree c representing a magnitude of an effect that the f-th vector component of the feature vector $XN_i$ (that is, a feature corresponding to the f-th element of the neighbor data $DN_i$) exerts on the distance $d_i$ between the query data DQ and the neighbor data $DN_i$ in the latent space. Note that in the following description, the element contribution degree c representing a magnitude of an effect that the f-th vector component of the feature vector $XN_i$ exerts on the distance $d_i$ is referred to as "element contribution degree $c_{i,f}$". In other words, the contribution degree calculation unit 425 calculates the element contribution degree $c_{i,f}$ that represents a magnitude of a degree of importance of the f-th vector component of the feature vector $XN_i$ in calculation of the distance $d_i$. Specifically, the contribution degree calculation unit 425 calculates the element contribution degree $c_{i,f}$ based on the difference information $v_{i,f}$ and the local model LM generated by the local model training unit 424. Note that operation of calculating the element contribution degree $c_{i,f}$ will be described in detail later with reference to FIG. 7 and others.

The output control unit 426 may control the output apparatus 44, which will be described later, in such a manner that the output apparatus 44 outputs information related to at least one of the n neighbor data $DN_1$ to $DN_n$ extracted by the retrieval unit 423. The output control unit 426 may control the output apparatus 44, which will be described later, in such a manner that the output apparatus 44 outputs the element contribution degree $c_{i,f}$ calculated by the contribution degree calculation unit 425, in addition to, or in place of, the information related to at least one of the n neighbor data $DN_1$ to $DN_n$.

The input apparatus 43 is an apparatus that receives an input of information to the information processing apparatus 4 from an outside of the information processing apparatus 4. For example, the input apparatus 43 may include an operation apparatus (for example, at least one of a keyboard, a mouse, and a touch panel) that can be operated by a user of the information processing apparatus 4. For example, the input apparatus 43 may include a reception apparatus (that is, a communication apparatus) that can receive information transmitted as data to the information processing apparatus 4 from the outside of the information processing apparatus 4 via a communication network.

The output apparatus 44 is an apparatus that outputs information. For example, the output apparatus 44 may output information related to the threat detection operation performed by the information processing apparatus 4 (for example, information related to a detected threat). An example of such an output apparatus 44 is a display (display apparatus) that can output (that is, can display) the information as an image. An example of the output apparatus 44 is a speaker (audio output apparatus) that can output the information as audio. An example of the output apparatus 44 is a printer that can output a paper document on which the information is printed. An example of the output apparatus 44 is a transmission apparatus (that is, a communication apparatus) that can transmit the information as data via the communication network or the data bus.

(2) Operation Performed by Information Processing Apparatus 4

Next, operation performed by the information processing apparatus 4 is described. As mentioned above, the information processing apparatus 4 performs the threat detection operation for detecting a threat that has already intruded in the local system L. Further, before performing the threat detection operation, the information processing apparatus 4 may perform model generation operation for generating the transformation model TM that is used in the threat detection operation. Accordingly, in the following, the model generation operation and the threat detection operation are described sequentially.

(2-1) Model Generation Operation

Figures 5, 6:
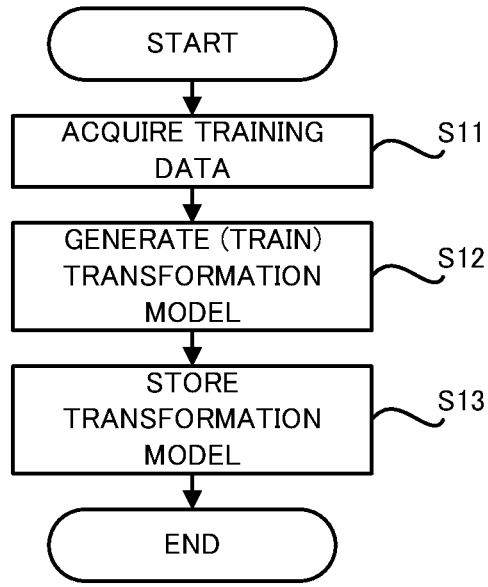
FIG. 5 is a flowchart illustrating a flow of model generation operation performed by the information processing apparatus.
FIG. 6 is a data structure diagram illustrating a data structure of a training dataset in the present example embodiment.

First, the model generation operation performed by the information processing apparatus 4 is described with reference to FIG. 5. FIG. 5 is a flowchart illustrating a flow of the model generation operation performed by the information processing apparatus 4.

As illustrated in FIG. 5, the metric learning unit 422 acquires at least one tuple of training data 4131 from the training dataset 413 (step S11).

An example of a data structure of the training dataset 413 is illustrated in FIG. 6. As illustrated in FIG. 6, the training dataset 413 includes a plurality of tuples of training data 4131. The metric learning unit 422 may acquire all of the plurality of tuples of training data 4131 included in the training dataset 413. Alternatively, the metric learning unit 422 may acquire a part of the plurality of tuples of training data 4131 included in the training dataset 413, and may not acquire other part of the plurality of tuples of training data 4131 included in the training dataset 413.

Each tuple of training data 4131 includes data designation information that designates two of the plurality of tuples of feature data DV (that is, feature data $DV_1$ to $DV_K$) included in the feature dataset 412. As described above, each feature data DV can be uniquely distinguished based on a data identifier for identifying a log data group corresponding to the feature vector XV included in the feature data DV. Accordingly, as illustrated in FIG. 6, the data designation information may include data identifiers for the two tuples of feature data DV.

Each tuple of training data 4131 further includes label information that indicates whether or not the two tuples of feature data DV designated by the data designation information corresponds to a positive example or corresponds to a negative example. In the example illustrated in FIG. 6, label information indicating "0" is assumed to indicate that the two tuples of feature data DV designated by the data designation information corresponds to a negative example, and label information indicating "1" is assumed to indicate that the two tuples of feature data DV designated by the data designation information corresponds to a positive example. In the present example embodiment, two tuples of feature data DV corresponding to a positive example may mean two tuples of feature data DV having similar features. Here, the two tuples of feature data DV having similar features may be two tuples of feature data DV between which a distance in the latent space is less than a predetermined first threshold value. In contrast, two tuples of feature data DV corresponding to a negative example may mean two tuples of feature data DV having dissimilar features. Here, the two tuples of feature data DV having dissimilar features may be two tuples of feature data DV between which a distance in the latent space is larger than a predetermined second threshold value (where the second threshold value is equal to or larger than the first threshold value).

Referring again to FIG. 5, the metric learning unit 422 generates the transformation model TM, based on the training data 4131 acquired in step S11 (step S12). Specifically, for example, the metric learning unit 422 may generate the transformation model TM by performing learning operation for training the transformation model TM. Accordingly, the transformation model TM may be a model that can learn. For example, the transformation model TM may be a model including a neural network that can learn a parameter (for example, at least one of a weight and a bias).

In the present example embodiment, the metric learning unit 422 may generate the transformation model TM by performing distance metric learning (in other words, metric learning). Metric learning is a learning method for generating a transformation model that can transform a feature vector of each tuple of data generally in such a manner that a distance between two or more tuples of similar data becomes relatively short and a distance between two or more tuples of dissimilar data becomes relatively long in a vector space. Accordingly, in the present example embodiment, the metric learning unit 422 may generate, by performing metric learning, the transformation model TM that can transform a plurality of feature vectors XV into a plurality of latent vectors ZV, respectively, in such a manner that in the latent space, a distance between two or more tuples of similar feature data DV (that is, a distance between two or more latent vectors ZV corresponding to the two or more tuples of similar feature data DV, respectively) becomes relatively short and a distance between two or more tuples of dissimilar feature data DV (that is, a distance between two or more latent vectors ZV corresponding to the two or more tuples of dissimilar feature data DV, respectively) becomes relatively long. For example, the metric learning unit 422 may generate, by performing metric learning, the transformation model TM that can transform a plurality of tuples of feature vectors XV into a plurality of latent vectors $Z_v$, respectively, in such a manner that a distance in the latent space between two or more tuples of similar feature data DV becomes equal to or more than a distance in the latent space between two or more tuples of dissimilar feature data DV. For example, the metric learning unit 422 may generate, by performing metric learning, the transformation model TM that can transform a plurality of feature vectors XV into a plurality of latent vectors ZV, respectively, in such a manner that (i) a distance in the latent space between two or more tuples of similar feature data DV becomes equal to or less than a distance in the presentation space between the two or more tuples of similar feature data DV (that is, a distance between two or more feature vectors XV corresponding to the two or more tuples of similar feature data DV, respectively), and (ii) a distance in the latent space between two or more tuples of dissimilar feature data DV becomes equal to or more than a distance in the presentation space between the two or more tuples of dissimilar feature data DV (that is, a distance between two or more feature vectors XV corresponding to the two or more tuples of dissimilar feature data DV, respectively).

The metric learning unit 422 may perform metric learning, for example, by using a neural network that is used for performing metric learning. An example of the neural network that is used for performing metric learning is at least one of a Siamese network and a triplet network.

An example of the metric learning performed by using the training data 4131 is described below. Based on the training data 4131, the metric learning unit 422 extracts, from the feature dataset 412, at least one dataset including two feature vectors XV to which label information corresponding to a positive example is given. Further, based on the training data 4131, the metric learning unit 422 extracts, from the feature dataset 412, at least one pair of two feature vectors XV to which label information corresponding to a negative example is given. The metric learning unit 422 inputs extracted two feature vectors XV into the transformation model TM, thereby acquiring two latent vectors ZV corresponding to the two feature vectors XV. Thereafter, the metric learning unit 422 calculates a distance between the two latent vectors ZV. The metric learning unit 422 performs metric learning in such a manner that a distance between the two latent vectors ZV acquired by transforming the two feature vectors XV to which the label information corresponding to a positive example is given becomes relatively short, and that a distance between the two latent vectors ZV acquired by transforming the two feature vectors XV to which the label information corresponding to a negative example is given becomes relatively long. Accordingly, the metric learning unit 422 may perform the metric learning by using a loss function that is determined based on a distance between two latent vectors ZV in the latent space. For example, when the metric learning unit 422 performs the metric learning by using a Siamese network as mentioned above, the metric learning unit 422 may use a loss function based on contrastive loss.

Thereafter, the storage apparatus 41 stores the transformation model TM generated in step S12 (step S13). The transformation model TM stored in the storage apparatus 41 is used in the threat detection operation, which will described below.

(2-2) Threat Detection Operation

Figure 7:
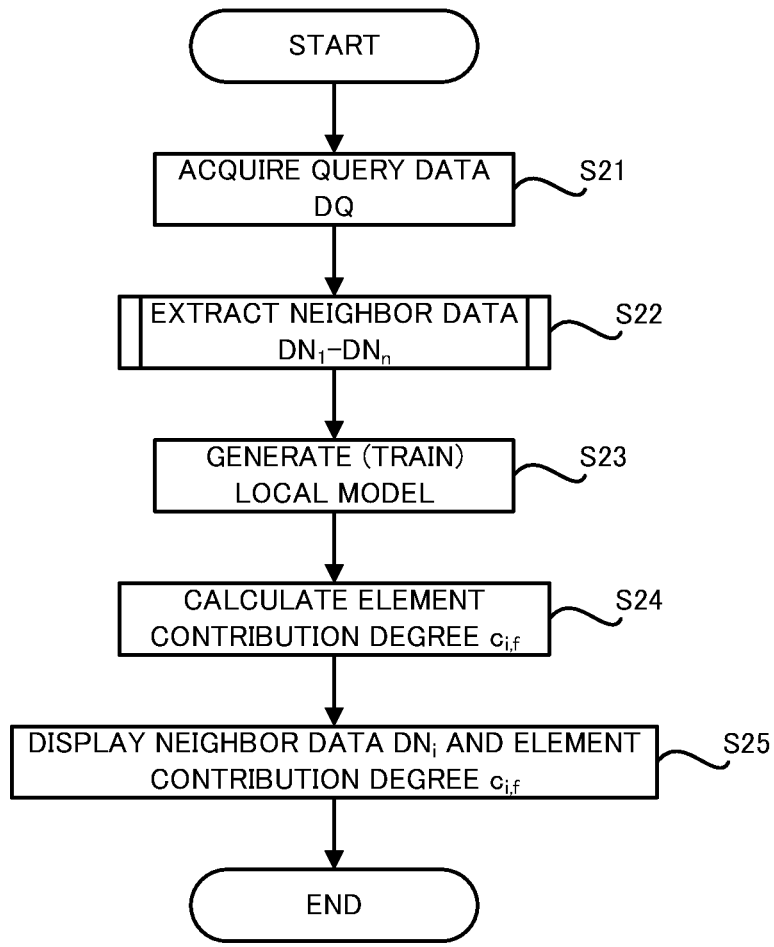
FIG. 7 is a flowchart illustrating a flow of threat detection operation performed by the information processing apparatus.

Next, the threat detection operation performed by the information processing apparatus 4 is described with reference to FIG. 7. FIG. 7 is a flowchart illustrating a flow of the threat detection operation performed by the information processing apparatus 4. Note that start of the threat detection operation illustrated in FIG. 7 may be triggered by an input of query data DQ into the information processing apparatus 4. When a plurality of tuples of query data DQ is inputted into the information processing apparatus 4, the threat detection operation is performed for each tuple of query data DQ. For example, when first query data DQ and second query data DQ are inputted into the information processing apparatus 4, the threat detection operation for the first query data DQ and the threat detection operation for the second query data DQ are performed.

As illustrated in FIG. 7, first, the retrieval unit 423 acquires query data DQ (step S21). For example, the retrieval unit 423 may acquire, as the query data DQ, information that directly or indirectly specifies a detection-target threat (or a feature vector XQ) to be inputted into the information processing apparatus 4 via the input apparatus 43 that can function as a user-operable operation apparatus. For example, the retrieval unit 423 may acquire, as the query data DQ, information for directly or indirectly specifying a detection-target threat (or a feature vector XQ) to be transmitted to the information processing apparatus 4 via the input apparatus 43 that can function as a communication apparatus.

Figure 8:
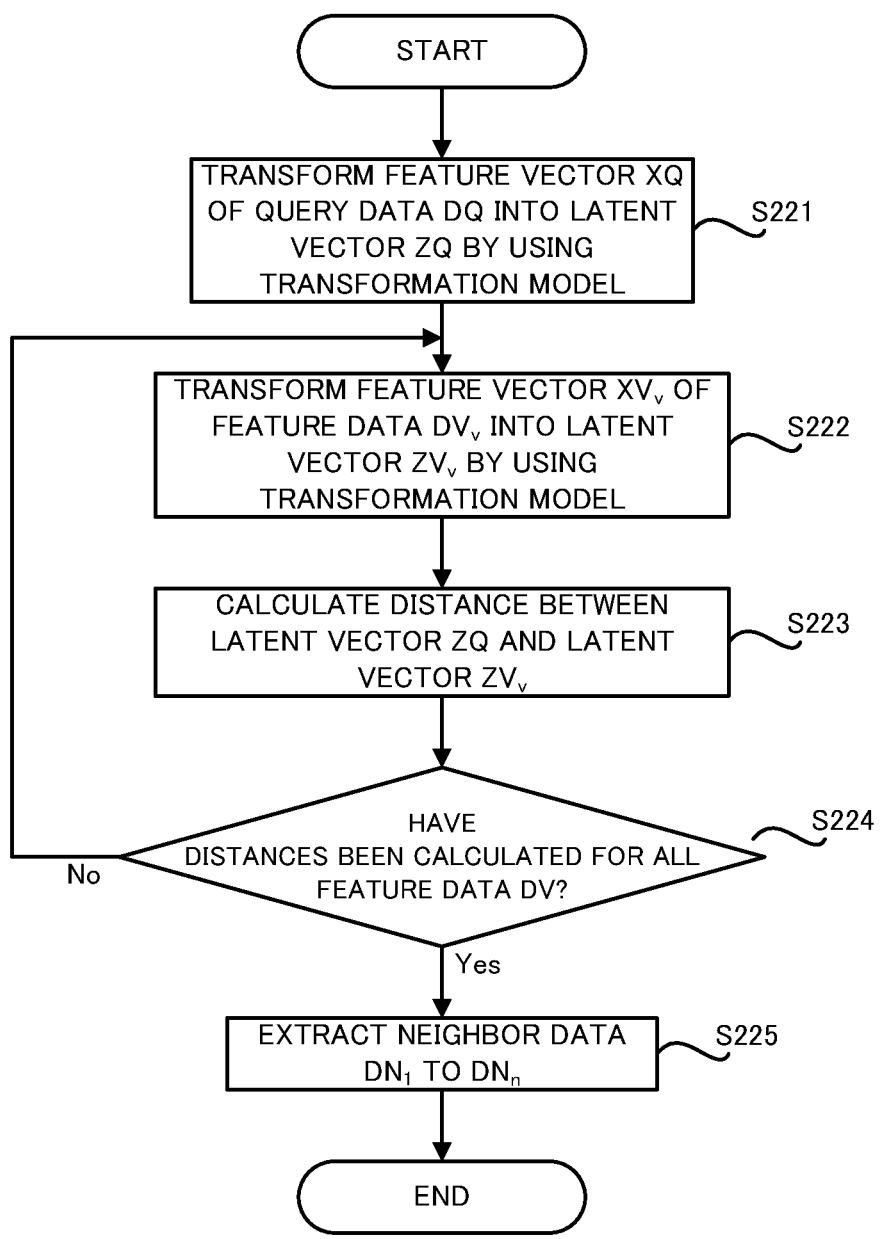
FIG. 8 is a flowchart illustrating a flow of operation of extracting n tuples of neighbor data.

Thereafter, based on the query data DQ acquired in step S21, the retrieval unit 423 extracts n tuples of neighbor data $DN_1$ to $DN_n$ from the feature dataset 412 (step S22). Hereinafter, operation of extracting the n tuples of neighbor data $DN_1$ to $DN_n$ is described with reference to FIG. 8. FIG. 8 is a flowchart illustrating a flow of the operation of extracting the n tuples of neighbor data $DN_1$ to $DN_n$.

As illustrated in FIG. 8, the retrieval unit 423 transforms, by using the transformation model TM stored in the storage apparatus 41, the feature vector XQ of the query data DQ acquired in step 21 into a latent vector ZQ representing features of the detection-target threat within the latent space (step S221).

In parallel with, before or after the operation in step S221, the retrieval unit 423 extracts one tuple of feature data $DV_v$ among the plurality of tuples of feature data DV included in the feature dataset 412 (step S222). Thereafter, the retrieval unit 423 transforms, by using the transformation model TM, a feature vector $XV_v$ of the extracted feature data $DV_v$ into a latent vector $ZV_v$ (step S222). Thereafter, the retrieval unit 423 calculates a distance (that is, a distance in the latent space) between the latent vector ZQ generated in step S221 and the latent vector $ZV_v$ generated in step S222 (step S223).

The retrieval unit 423 repeats the operation in step S222 to step S223, for each of the plurality of tuples of feature data DV included in the feature dataset 412 (step S224). As described above, the feature dataset 412 includes K tuples of feature data $DV_1$ to $DV_K$. Accordingly, the retrieval unit 423 extracts one new tuple of feature data $DV_v$ that is not yet extracted in step S222, from among the plurality of tuples of feature data DV included in the feature dataset 412, and then repeats the operation in step S222 to step S223 until completing calculation of K distances between the latent vector ZQ and K latent vectors $ZV_1$ to $ZV_K$ corresponding to the K tuples of feature data $DV_1$ to $DV_K$, respectively. Specifically, the retrieval unit 423 repeats the operation in step S222 to step S223 until completing calculation of the distance between the latent vector ZQ and the latent vector $ZV_1$ corresponding to the feature data $DV_1$, the distance between the latent vector ZQ and the latent vector $ZV_2$ corresponding to the feature data $DV_2$, . . . , and the distance between the latent vector ZQ and the latent vector $ZV_K$ corresponding to the feature data $DV_K$.

Thereafter, based on the distances calculated in step S223, the retrieval unit 423 extracts n tuples of feature data DV among the plurality of tuples of feature data DV included in the feature dataset 412, as the n tuples of neighbor data $DN_1$ to $DN_n$, respectively (step S225). Specifically, the retrieval unit 423 extracts, as the n tuples of neighbor data $DN_1$ to $DN_n$, n tuples of feature data DV having short distances from the query data DQ in the latent space, compared to the other (K−n) tuples of feature data DV, from among the K tuples of feature data DV. In other words, the retrieval unit 423 extracts, from among the K tuples of feature data DV, n tuples of feature data DV in ascending order of the calculated distance, and sets the extracted n tuples of feature data DV as the n tuples of neighbor data $DN_1$ to $DN_n$, respectively.

Referring again to FIG. 7, thereafter, the local model training unit 424 generates the local model LM, based on the n tuples of neighbor data $DN_1$ to $DN_n$ extracted in step S22 (step S23).

In the present example embodiment, a case is described in which the local model LM is a linear regression model, for explanatory convenience. As described above, the local model LM is a model that outputs the estimation value $dp_i$ of the distance $d_i$ between the query data DQ and the neighbor data $DN_i$ in the latent space when the difference information $V_i$ (=$v_{i,1}$ to $v_{i,F}$) related to a difference between the query data DQ and the neighbor data $DN_i$ in the presentation space is inputted. Accordingly, the local model LM may be a linear regression model in which the difference information $V_i$ (=$v_{i,1}$ to $v_{i,F}$) is used for an explanatory variable, and the estimation value $dp_i$ of the distance $d_i$ is used for an objective variable. An example of such a local model LM is indicated by expression 1. Note that $w_f$ in the expression 1 is a weight by which the difference information $v_{i,f}$ is multiplied. The weight $w_f$ (specifically, each of $w_1$ to $w_F$) is a weight equal to or more than zero. In other words, the weight $w_f$ (specifically, each of $w_1$ to $w_F$) is a weight that does not have a negative value. Moreover, as indicated by the expression 1, the local model LM is a linear regression model specified by a regression expression that does not include a bias term (that is, a bias term is zero).

$$dp_i = \sum_{f=1}^{F} w_f \times v_{i,f} \quad \text{[Expression 1]}$$

However, the local model LM is not limited to the linear regression model represented by the expression 1. For example, the local model LM may be a linear regression model specified by a regression expression in which the weight $w_f$ (specifically, at least one of $w_1$ to $w_F$) has a negative value. For example, the local model LM may be a linear regression model specified by a regression expression that includes a bias term (that is, a bias term is not zero). Alternatively, the local model LM is not limited to a linear regression model. For example, the local model LM may be a non-linear regression model. For example, the local model LM may be any other arbitrary model.

To generate the local model LM, the local model training unit 424 generates the difference information $V_i$ (=$v_{i,1}$ to $v_{i,F}$). In other words, the local model training unit 424 generates the difference information $V_1$ (=$v_{1,1}$ to $v_{1,F}$), the difference information $V_2$ (=$v_{2,1}$ to $v_{2,F}$), . . . , and the difference information $V_n$ (=$v_{n,1}$ to $v_{n,F}$). Note that in the following description, an example is described in which the difference information $v_{i,f}$ is specified by the above-mentioned expression, $v_{i,f}$=|$xq_f$−$xn_{i,f}$| or $v_{i,f}$=($xq_f$−$xn_{i,f}$)$^2$. Accordingly, the local model training unit 424 generates the difference information $V_i$ by using the expression $v_{i,f}$=|$xq_f$−$xn_{i,f}$| or $v_{i,f}$=($xq_f$−$xn_{i,f}$)$^2$.

Thereafter, the local model training unit 424 generates the local model LM, based on the neighbor data $DN_1$ to $DN_n$ extracted in step S22 and the difference information $V_1$ to $V_n$ calculated in step S23.

Specifically, the local model training unit 424 sequentially inputs the difference information $V_1$ to $V_n$ into the generated or default local model LM. As a result, the local model training unit 424 acquires the estimation value $dp_1$ of the distance $d_1$ in the latent space between the query data DQ and the neighbor data $DN_1$, the estimation value $dp_2$ of the distance $d_2$ in the latent space between the query data DQ and the neighbor data $DN_2$, . . . , and the estimation value $dp_n$ of the distance $d_n$ in the latent space between the query data DQ and the neighbor data $DN_n$.

Thereafter, the local model training unit 424 updates the weight $w_f$ (=$w_1$ to $w_F$) that defines the local model LM, by using a loss function Loss based on an error between the actual distance $d_i$ and the estimation value $dp_i$ of the distance $d_i$. Note that the actual distance $d_i$ (that is, a calculation value of the distance $d_i$) corresponds to the distance calculated based on the latent vector ZQ and the latent vector ZV (that is, the latent vector $ZN_i$ generated by transforming the feature vector $XN_i$ of the neighbor data $DN_i$ by using the transformation model TM) in step S223 in FIG. 8 in order to extract the neighbor data $DN_i$. The loss function Loss may be a loss function whose value becomes less as the error between the actual calculation value of the distance $d_i$ and the estimation value $dp_i$ of the distance $d_i$ becomes smaller. In such a case, the local model training unit 424 may update the weight $w_f$ (=$w_1$ to $w_F$) that defines the local model LM in such a manner that the value of the loss function Loss becomes minimum. An example of such a loss function Loss is indicated by expression 2. However, the loss function Loss is not limited to the loss function indicated by the expression 2.

$$\text{Loss} = \frac{1}{n}\sum_{i=1}^{n}(d_i - dp_i)^2 \quad \text{[Expression 2]}$$

Thereafter, the contribution degree calculation unit 425 calculates the element contribution degree $c_{i,f}$ that represents a magnitude of an effect that the f-th one of the vector components of the feature vector $XN_i$ (that is, features corresponding to the F elements of the neighbor data $DN_i$) exerts on the distance $d_i$ in the latent space between the query data DQ and the neighbor data $DN_i$ (step S24). When a variation in the distance $d_i$ occurring when the P-th (where p is a variable indicating an integer that satisfies 1≤p≤F) vector component of the feature vector $XN_i$ changes by a certain amount is larger than a variation in the distance $d_i$ occurring when the r-th (where r is a variable indicating an integer that satisfies 1≤r≤F and r≠p) vector component of the feature vector $XN_i$ changes by the same certain amount, an effect that the p-th vector component of the feature vector $XN_i$ exerts on the distance $d_i$ is larger than an effect that the r-th vector component of the feature vector $XN_i$ exerts on the distance $d_i$. Accordingly, an element contribution degree $c_{i,p}$ is larger than an element contribution degree $c_{i,r}$.

To calculate such an element contribution degree $c_{i,f}$, the contribution degree calculation unit 425 calculates the element contribution degree $c_{i,f}$ based on the local model LM generated in step S23 and the difference information $v_{i,f}$. For example, the contribution degree calculation unit 425 may calculate the element contribution degree $c_{i,f}$ by using expression 3. The expression 3 is an expression used to calculate the element contribution degree $c_{i,f}$ based on a parameter (the weight $w_f$ in the present case) defining the local model LM, and on the difference information $v_{i,f}$.

$$c_{i,f} = \frac{w_f \times v_{i,f}}{dp_i} = \frac{w_f \times v_{i,f}}{\sum_{f'=1}^{F} w_{f'} \times v_{i,f'}} \quad \text{[Expression 3]}$$

The contribution degree calculation unit 425 calculates the element contribution degree $c_{i,f}$ while changing a variable f in a range of 1 to F and changing a variable i in a range of 1 to n, thereby calculating the element contribution degrees $c_{1,1}$, $c_{1,2}$, ..., and $c_{1,F}$, the element contribution degrees $c_{2,1}$, $c_{2,2}$, ..., and $c_{2,F}$, ..., and the element contribution degrees $c_{n,1}$, $c_{n,2}$, ..., and $c_{n,F}$. Note that when the element contribution degree $c_{i,f}$ is calculated by using the above expression 3, the sum of the element contribution degrees $c_{i,1}$ to $c_{i,F}$ is one.

Thereafter, the output control unit 426 may control the output apparatus 44 in such a manner that the output apparatus 44 outputs information related to at least one of the n tuples of neighbor data $DN_1$ to $DN_n$ extracted by the retrieval unit 423 in step S23 (step S25). Note that the information related to the neighbor data $DN_i$ may include information related to proxy log data 4111 that is a base for calculation of the feature vector $XN_i$ of the neighbor data $DN_i$. In other words, the output control unit 426 may control the output apparatus 44 in such a manner that the output apparatus 44 outputs information related to proxy log data 4111 corresponding to at least one of the n tuples of neighbor data $DN_1$ to $DN_n$ extracted by the retrieval unit 423 in step S23.

Alternatively, the output control unit 426 may control the output apparatus 44 in such a manner that the output apparatus 44 outputs at least one of the element contribution degrees $c_{1,1}$ to $c_{n,F}$ calculated by the contribution degree calculation unit 425 in step S24, in addition to, or in place of, the information related to at least one of the n tuples of neighbor data $DN_1$ to $DN_n$ (step S25).

As an example, the output control unit 426 may control the output apparatus 44 in such a manner that the output apparatus 44 outputs a list of the element contribution degrees $c_{1,1}$ to $c_{n,F}$, as illustrated in FIG. 9. Note that FIG. 9 illustrates an example of the list of the element contribution degrees $c_{1,1}$ to $c_{n,F}$ outputted by the output apparatus 44 when the output apparatus 44 is a display apparatus (that is, displayed by the display apparatus). In the example illustrated in FIG. 9, the neighbor data $DN_i$ includes the first vector component indicting a feature related to a minimum value of the reception size, the second vector component indicting a feature related to a maximum value of the reception size, the third vector component indicting a feature related to a minimum value of the transmission size, the fourth vector component indicting a feature related to a maximum value of the transmission size, the fifth vector component indicting a feature related to the sum of the reception size and the transmission size, the sixth vector component indicting a feature related to a method (GET), the seventh vector component indicting a feature related to a method (POST), and the eighth vector component indicting a feature related to methods (other). In such a case, the output control unit 426 may control the output apparatus 44 in such a manner that the output apparatus 44 outputs a list of: the element contribution degrees $c_{i,1}$ indicating effects that the feature related to the minimum value of the reception size exerts on the distance $d_i$; the element contribution degrees $c_{i,2}$ indicating effects that the feature related to the maximum value of the reception size exerts on the distance $d_i$; the element contribution degrees $c_{i,3}$ indicating effects that the feature related to the minimum value of the transmission size exerts on the distance $d_i$; the element contribution degrees $c_{i,4}$ indicating effects that the feature related to the maximum value of the transmission size exerts on the distance $d_i$; the element contribution degrees $c_{i,5}$ indicating effects that the feature related to the sum of the reception size and the transmission size exerts on the distance $d_i$; the element contribution degrees $c_{i,6}$ indicating effects that the feature related to the method (GET) exerts on the distance $d_i$; the element contribution degrees $c_{i,7}$ indicating effects that the feature related to the method (POST) exerts on the distance $d_i$; and the element contribution degrees $c_{i,8}$ indicating effects that the feature related to the methods (other) exerts on the distance $d_i$.

In the example illustrated in FIG. 9, the element contribution degrees $c_{1,1}$ to $c_{1,4}$ are relatively large. Accordingly, it can be understood that the effects that the features related to each of the reception size and the transmission size exert on the distance $d_i$ in the latent space between the query data DQ and the neighbor data $DN_1$ are relatively large. Moreover, in the example illustrated in FIG. 9, the element contribution degrees $c_{2,1}$ to $c_{2,1}$ are relatively large. Accordingly, it can be understood that the effects that the features related to the reception size exert on the distance $d_2$ in the latent space between the query data DQ and the neighbor data $DN_2$ are relatively large. Further, in the example in FIG. 9, the element contribution degrees $c_{3,1}$ to $c_{3,1}$ are relatively large. Accordingly, it can be understood that the effects that the features related to the reception size exert on the distance $d_3$ in the latent space between the query data DQ and the neighbor data $DN_3$ are relatively large.

(3) Technical Advantageous Effects of Information Processing Apparatus 1

As described hereinabove, the information processing apparatus 4 in the present example embodiment can calculate the element contribution degree $c_{i,f}$ representing a magnitude of an effect that a feature corresponding to the f-th element of the neighbor data $DN_i$ exerts on the distance $d_i$ in the latent space between the query data DQ and the neighbor data $DN_i$. Accordingly, a user of the information processing apparatus 4 can find a feature that exerts a relatively large effect on the distance $d_i$ (in other words, that relatively largely contributes to calculation of the distance $d_i$), based on the element contribution degree $c_{i,f}$.

Moreover, the information processing apparatus 4 can generate the local model LM, and can calculate the element contribution degree $c_{i,f}$ by using the generated local model LM (for example, the weight $w_f$ defining the local model LM). Accordingly, the information processing apparatus 4 can relatively easily calculate the element contribution degree $c_{i,f}$.

The information processing apparatus 4 can calculate the element contribution degree $c_{i,f}$ by using the weight $w_f$ that defines the generated local model LM. Accordingly, the information processing apparatus 4 can calculate the element contribution degree $c_{i,f}$ by using a relatively simple expression (in particular, an expression that is easy to handle for an apparatus performing matrix operation) like the above-mentioned expression 1.

Moreover, in the above-described example, the local model LM is a linear regression model specified by a regression expression that does not include a bias term. If the local model LM is a linear regression model specified by a regression expression that includes a bias term, the information processing apparatus 4 needs to consider a shift from an original point (that is, an offset amount within the presentation space and/or the latent space) caused due to the bias term when the local model LM is calculated and/or when the element contribution degree $c_{i,f}$ is calculated. In other words, when performing a matrix operation for calculating the local model LM and/or calculating the element contribution degree $c_{i,f}$, the information processing apparatus 4 needs to consider not only an inner product of matrices, but also an offset amount in (that is, an addition to or a subtraction from) a matrix component. However, in the present example embodiment, since the local model LM is a linear regression model specified by a regression expression that does not include a bias term, the information processing apparatus 4 does not need to consider a shift from an original point (that is, an offset amount within the presentation space and/or the latent space) caused due to a bias term when the local model LM is calculated and/or when the element contribution degree $c_{i,f}$ is calculated. Accordingly, the information processing apparatus 4 can relatively easily calculate the local model LM and/or calculate the element contribution degree $c_{i,f}$.

In the above-described example, the local model LM is a linear regression model specified by a regression expression in which the weight $w_f$ is equal to or more than zero. If the local model LM is a linear regression model specified by a regression expression that allows the weight $w_f$ to be less than zero, the element contribution degree $c_{i,f}$ may have a negative value. However, it is thought that a negative element contribution degree $c_{i,f}$ is difficult for a user of the information processing apparatus 4 to intuitionally understand. In contrast, in the present example embodiment, since the local model LM is a linear regression model specified by a regression expression in which the weight $w_f$ is equal to or more than zero, the element contribution degree $c_{i,f}$ does not have a negative value. Accordingly, the information processing apparatus 4 can calculate the element contribution degree $c_{i,f}$ that is easy for a user of the information processing apparatus 4 to intuitionally understand.

Note that the information processing apparatus 4 may identify, based on the element contribution degree $c_{i,f}$, a factor that makes the distance $d_i$ in the latent space between the query data DQ and the neighbor data $DN_i$ relatively small. In other words, based on the element contribution degree $c_{i,f}$, the information processing apparatus 4 may identify a factor leading it to be determined that the query data DQ and the neighbor data $DN_i$ are similar. For example, in the above-described example illustrated in FIG. 9, the element contribution degrees $c_{3,1}$ to $c_{3,2}$ are relatively large. In such a case, the information processing apparatus 4 may identify the reception size as the factor leading it to be determined that the query data DQ and the neighbor data $DN_3$ are similar. Note that when the query data DQ and the neighbor data $DN_3$ are similar as described above, it is conceivable that a threat that is the same as or similar to the detection-target threat specified by the query data DQ may have already intruded in the local system L. In such a case, the factor leading it to be determined that the query data DQ and the neighbor data $DN_3$ are similar can be said to be equivalent to a factor leading it to be determined that proxy log data 4111 corresponding to the neighbor data $DN_3$ indicates a trace of the threat that is the same as or similar to the detection-target threat.

Based on the element contribution degree $c_{i,f}$, the information processing apparatus 4 may classify then tuples of neighbor data $DN_1$ to $DN_n$ extracted by the retrieval unit 423. Specifically, the information processing apparatus 4 may classify the n tuples of neighbor data $DN_1$ to $DN_n$ in such a manner that tuples of neighbor data $DN_i$ having similar element contribution degrees $c_{i,f}$ are classified into the same contribution data group. In such a case, the information processing apparatus 4 may perform learning operation for updating the weight $w_f$ of the local model LM by using the tuples of neighbor data $DN_i$ classified into the same contribution data group.

Based on the element contribution degree $c_{i,f}$, the information processing apparatus 4 may determine whether or not the retrieval unit 423 extracts, in error, at least one of the n tuples of neighbor data $DN_1$ to $DN_n$. For example, since the n tuples of neighbor data $DN_1$ to $DN_n$ are similar to the query data DQ in the first place, the probability is not high in general that a vector including the F element contribution degrees $c_{1,1}$, to $c_{1,F}$ corresponding to the neighbor data $DN_1$, a vector including the F element contribution degrees $c_{2,1}$ to $c_{2,F}$ corresponding to the neighbor data $DN_2$, ..., and a vector including the F element contribution degrees $c_{n,1}$ to $c_{n,F}$ corresponding to the neighbor data $DN_n$ greatly differ from each other. In such a situation, when a difference between a vector including the F element contribution degrees $c_{j,f}$ corresponding to neighbor data $DN_j$ (where j is a variable indicating an integer that satisfies 1≤j≤n) and a vector including the F element contribution degrees $c_{i,f}$ corresponding to other neighbor data DN than the neighbor data $DN_j$ (that is, each of the vector including the F element contribution degrees $c_{1,f}$ corresponding to the neighbor data $DN_1$, ..., the vector including the F element contribution degrees $c_{j-1,f}$ corresponding to the neighbor data $DN_{j-1}$, the vector including the F element contribution degrees $c_{j+1,f}$ corresponding to the neighbor data $DN_{j+1}$, ..., and the vector including the F element contribution degrees $c_{n,f}$ corresponding to the neighbor data $DN_n$) is so large as to exceed an allowable amount, it is conceivable that the retrieval unit 423 has extracted the neighbor data $DN_j$ as similar data to the query data DQ in error. From such a perspective, the information processing apparatus 4 may determine, based on the element contribution degree $c_{i,f}$, whether or not the retrieval unit 423 has extracted at least one of the n tuples of neighbor data $DN_1$ to $DN_n$ in error.

(4) Modifications

Subsequently, modifications of the communication system SYS (particularly, the information processing apparatus 4) are described.

(4-1) First Modification

In a first modification, the information processing apparatus 4 (particularly, the contribution degree calculation unit 425) may calculate a group contribution degree e, in addition to the element contribution degree $c_{i,f}$. The group contribution degree e is an indicator value that is calculated under a situation where each vector component of a feature vector of certain neighbor data (that is, each feature element indicated by the neighbor data) belongs to (in other words, is classified into) at least one of a plurality of feature groups. Specifically, the group contribution degree e represents a magnitude of an effect that each feature group exerts on a distance in the latent space between certain query data and certain neighbor data. In other words, the group contribution degree e represents a magnitude of an effect that at least one vector component belonging to each feature group (that is, at least one feature element classified into one feature group) exerts on the distance in the latent space between the certain query data and the certain neighbor data.

As an example, the plurality of feature groups may be groups respectively corresponding to a plurality of types of log information included in proxy log data 4111 that is a base for calculation of the feature vector $XN_i$. Specifically, in the above-described example, the proxy log data 4111 includes the reception size information, the transmission size information, and the method information, as a plurality of types of log information. In such a case, for the plurality of feature groups, a feature group related to the reception size, a feature group related to the transmission size, and a feature group related to the method may be used. In the above-described example, as illustrated in FIG. 9, the neighbor data $DN_i$ includes the first vector component indicating the feature related to the minimum value of the reception size, the second vector component indicating the feature related to the maximum value of the reception size, the third vector component indicating the feature related to the minimum value of the transmission size, the fourth vector component indicating the feature related to the maximum value of the transmission size, the fifth vector component indicating the feature related to the sum of the transmission size and the reception size, the sixth vector component indicating the feature related to the method (GET), the seventh vector component indicating the feature related to the method (POST), and the eighth vector component indicating the feature related to the methods (other). In such a case, the first vector component indicating the feature related to the minimum value of the reception size, the second vector component indicating the feature related to the maximum value of the reception size, and the fifth vector component indicating the feature related to the sum of the transmission size and the reception size may belong to the feature group related to the reception size. The third vector component indicating the feature related to the minimum value of the transmission size, the fourth vector component indicating the feature related to the maximum value of the transmission size, and the fifth vector component indicating the feature related to the sum of the transmission size and the reception size may belong to the feature group related to the transmission size. The sixth vector component indicating the feature related to the method (GET), the seventh vector component indicating the feature related to the method (POST), and the eighth vector component indicating the feature related to the methods (other) may belong to the feature group related to the reception size.

When each vector component of the feature vector $XN_i$ of the neighbor data $DN_i$ belongs to at least one of G (where G is a constant indicating an integer equal to or more than one) feature groups, the contribution degree calculation unit 425 may calculate the group contribution degree e representing a magnitude of an effect that the g-th (where g is a variable indicating an integer that satisfies $1 \leq g \leq G$) feature group exerts on the distance $d_i$ in the latent space between the query data DQ and the neighbor data $DN_i$. Note that in the following description, the group contribution degree e representing a magnitude of an effect that the g-th feature group exerts on the distance $d_i$ is referred to as "group contribution degree $e_{i,g}$". In other words, the contribution degree calculation unit 425 may calculate the group contribution degree $e_{i,g}$ that at least one vector component belonging to the g-th feature group exerts on the distance $d_i$. In such a case, the contribution degree calculation unit 425 may calculate the group contribution degree $e_{i,1}$ representing a magnitude of an effect that at least one vector component belonging to the first feature group on the distance $d_i$, the group contribution degree $e_{i,2}$ representing a magnitude of an effect that at least one vector component belonging to the second feature group exerts on the distance $d_i$, ..., and the group contribution degree $e_{i,G}$ representing a magnitude of an effect that at least one vector component belonging to the G-th feature group exerts on the distance $d_i$, by calculating the group contribution degree $e_{i,g}$ while changing the variable g in a range of 1 to G.

The contribution degree calculation unit 425 may calculate the group contribution degree $e_{i,g}$, based on the element contribution degree $c_{i,f}$. For example, the contribution degree calculation unit 425 may calculate the group contribution degree $e_{i,g}$ by using expression 4. The group contribution degree $e_{i,g}$ calculated by using the expression 4 is a sum of the element contribution degrees $c_{i,f}$ weighted with a belonging proportion $b_{g,f}$, which will be described later.

$$e_{i,g} = \sum_{f=1}^{F} b_{g,f} \times c_{i,f} \qquad \text{[Expression 4]}$$

Here, $b_{g,f}$ in the expression 4 represents a belonging proportion in which the f-th vector component of the neighbor data $DN_i$ belongs to the g-th feature group. Note that the belonging proportion $b_{g,f}$ is set in such a manner that a sum of the belonging proportions $b_{g,f}$ of the individual vector components (that is, $b_{1,f} + b_{2,f} + \ldots + b_{G,f}$) is one. For example, when the f-th vector component belongs only to the g-th feature group, the belonging proportion $b_{g,f}$ in which the f-th vector component belongs to the g-th feature group may be set to one (that is, 100%). For example, when the f-th vector component belongs to both the g1-th (where g1 is a variable indicating an integer that satisfies $1 \leq g1 \leq G$) feature group and the g2-th (where g2 is a variable indicating an integer that satisfies $1 \leq g2 \leq G$ and $g2 \neq g1$) feature group, the belonging proportion $b_{g1,f}$ in which the f-th vector component belongs to the g1-th feature group may be set to ½ (=50%), and the belonging proportion $b_{g2,f}$ in which the f-th vector component belongs to the g2-th feature group may be set to ½ (=50%). In other words, when one vector component belongs to H (where H is a constant indicating an integer equal to or more than two) feature groups, the belonging proportion $b_{g,f}$ in which the one vector component belongs to each of the H feature groups may be set to 1/N (=100/N %). Note that the belonging proportion $b_{g,f}$ may be preset, or may be set by the information processing apparatus 4 (particularly, the contribution degree calculation unit 425).

When the group contribution degree $e_{i,g}$ is calculated, the output control unit 426 may control the output apparatus 44 in such a manner that the output apparatus 44 outputs the group contribution degree $e_{i,g}$. For example, as described above, the group contribution degrees $e_{i,1}$ to $e_{i,G}$ respectively correspond to the G feature groups that respectively correspond to the G types of log information included in the proxy log data 4111. Accordingly, the output control unit 426 may control the output apparatus 44 in such a manner that the output apparatus 44 outputs proxy log data 4111 corresponding to the neighbor data $DN_i$ in an output form in which at least a part of the G types of log information included in the proxy log data 4111 are associated with at least a part of the G group contribution degrees $e_{i,1}$ to $e_{i,G}$, respectively.

A display form in which at least a part of the G types of log information are associated with at least a part of the G group contribution degrees $e_{i,1}$ to $e_{i,G}$, respectively, may include a display form in which the g-th log information corresponding to the g-th feature group is associated with the group contribution degree $e_{i,g}$ of the g-th feature group. Specifically, for example, the display form in which at least a part of the G types of log information are associated with at least a part of the G group contribution degrees $e_{i,1}$ to $e_{i,G}$, respectively, may include: (i) a display form in which log information related to the reception size is associated with the group contribution degree $e_{i,g}$ of the feature group related to the reception size; (ii) a display form in which log information related to the transmission size is associated with the group contribution degree $e_{i,g}$ of the feature group related to the transmission size; and (iii) a display form in which log information related to the method is associated with the group contribution degree $e_{i,g}$ of the feature group related to the method. As illustrated in FIG. 11a, the display form in which the g-th log information is associated with the group contribution degree $e_{i,g}$ may include a display form that displays the group contribution degree $e_{i,g}$ along with the g-th log information. As illustrated in FIG. 11b, the display form in which the g-th log information is associated with the group contribution degree $e_{i,g}$ may include a display form in which a display form (for example, at least one of color, brightness, luminance, and highlight) of the g-th log information is changed according to the group contribution degree $e_{i,g}$. For example, FIG. 11b illustrates an example in which log information having a relatively high group contribution degree $e_{i,g}$ is highlighted. The display form in which the g-th log information is associated with the group contribution degree $e_{i,g}$ may include a display form in which it is determined whether or not to display the g-th log information, based on the group contribution degree $e_{i,g}$. For example, when the group contribution degree $e_{i,g}$ is lower than a predetermined display threshold value, the g-th log information does not need to be displayed. For example, when the group contribution degree $e_{i,g}$ is higher than the predetermined display threshold value, the g-th log information may be displayed.

According to the first modification described above, the information processing apparatus 4 can calculate the group contribution degree $e_{i,g}$. Here, the group contribution degree $e_{i,g}$ is, for example, the sum of a plurality of element contribution degrees $c_{i,f}$ corresponding to the same feature group. Accordingly, variation in the group contribution degree $e_{i,g}$ is smaller than variation in each element contribution degree $c_{i,f}$. Accordingly, the information processing apparatus 4 can calculate the group contribution degree $e_{i,g}$ that can be regarded as a more stable contribution degree than the element contribution degrees $c_{i,f}$.

Moreover, the plurality of feature groups corresponds to the plurality of types of log information in the proxy log data 4111, respectively. Accordingly, when displaying the neighbor data $DN_i$ (that is, when displaying proxy log data 4111 corresponding to the neighbor data $DN_i$), the information processing apparatus 4 can relatively easily display the neighbor data $DN_i$ in a display form in which the group contribution degrees $e_{i,g}$ are associated with the neighbor data $DN_i$.

(4-2) Second Modification

Figure 12:
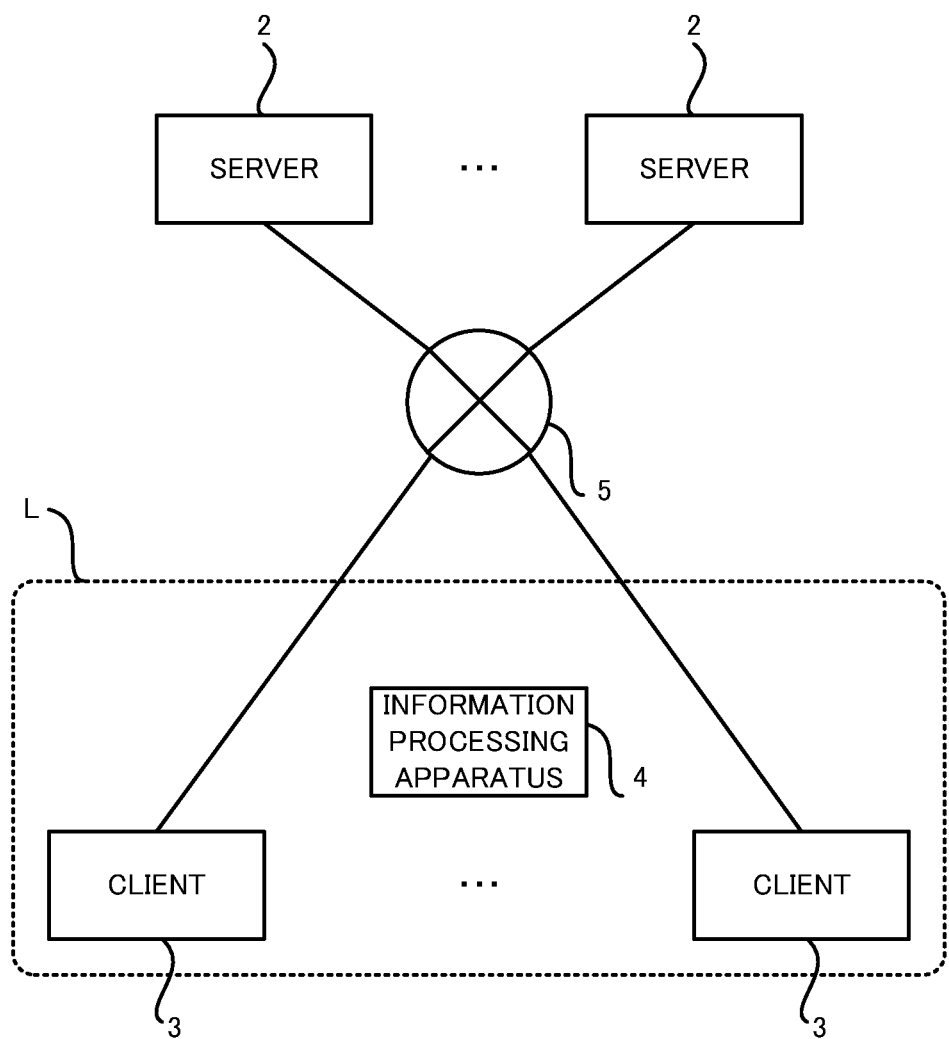
FIG. 12 is a block diagram illustrating a configuration of a communication system in a second modification.

In the above description, the communication system SYS includes the proxy server 1. However, in a second modification, the communication system SYS may omit to include the proxy server 1, as illustrated in FIG. 12. In other words, the clients 2 may communicate with the servers 3 without via the proxy server 1. The servers 3 may communicate with the clients 2 without via the proxy server 1. Also in such a case, the information processing apparatus 4 may perform the above-described threat detection operation by using log data indicating an archival record of a communication between each client 2 and each server 3.

(4-3) Third Modification

Figure 13:
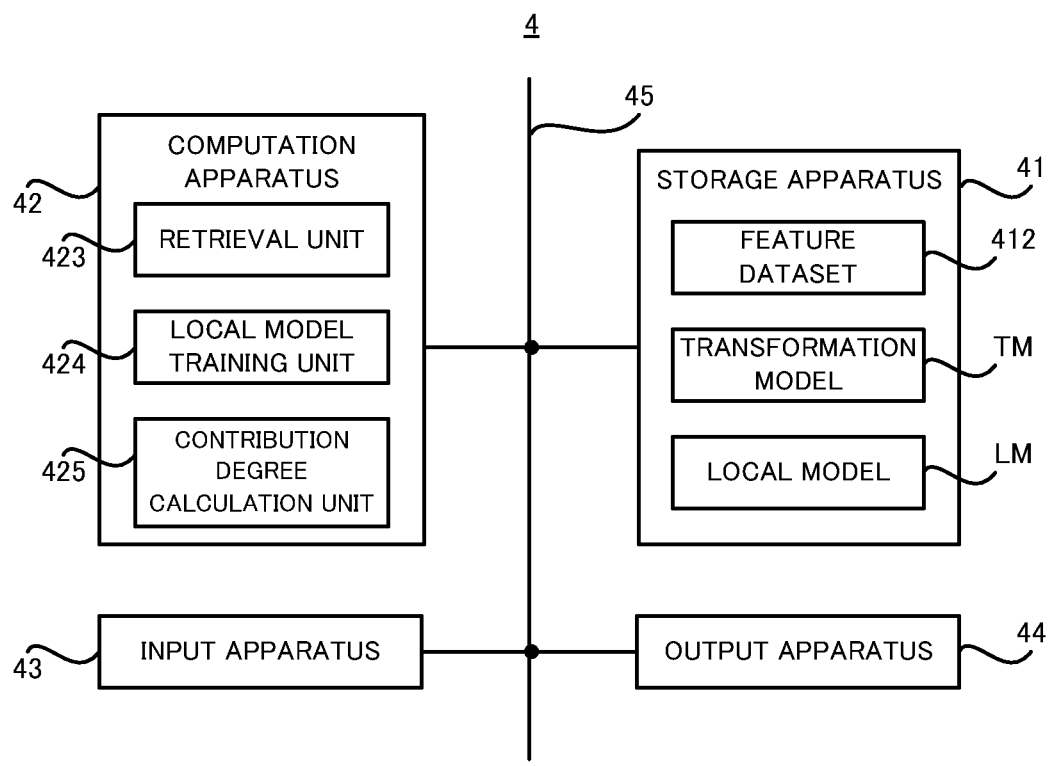
FIG. 13 is a block diagram illustrating a configuration of an information processing apparatus in a third modification.

In the above description, the information processing apparatus 4 includes the feature extraction unit 421. However, in a third modification, the information processing apparatus 4 may omit to include the feature extraction unit 421, as illustrated in FIG. 13. In such a case, the storage apparatus 41 may store the feature dataset 412 including a feature vector XV that is generated by using an arbitrary method from proxy log data 4111 included in the proxy log DB 411. Note that in such a case, the storage apparatus 41 does not need to store the proxy log DB 411, as illustrated in FIG. 13.

In the above description, the information processing apparatus 4 includes the metric learning unit 422. However, in the third modification, the information processing apparatus 4 may omit to include the metric learning unit 422, as illustrated in FIG. 13. In such a case, the storage apparatus 41 may include the transformation model TM that is generated by a different apparatus from the information processing apparatus 4. Note that in such a case, the storage apparatus 41 does not need to store the training dataset 413, as illustrated in FIG. 13.

In the above description, the information processing apparatus 4 includes the output control unit 426. However, in the third modification, the information processing apparatus 4 may omit to include the output control unit 426, as illustrated in FIG. 13. In such a case, the operation of outputting the neighbor data $DN_1$ to $DN_n$ and the element contribution degrees $c_{i,f}$ performed by the output control unit 426 may be performed by an external apparatus outside of the information processing apparatus 4.

(4-4) Fourth Modification

In the above description, the example embodiment of the information processing apparatus, the information processing method, and the recording medium is applied to the communication system SYS that performs the threat detection operation. However, in a fourth modification, the example embodiment of the information processing apparatus, the information processing method, and the recording medium may be applied to an arbitrary data processing apparatus that handles arbitrary data. Also in such a case, the data processing apparatus may perform the above-described model generation operation as long as a distance between a plurality of tuples of data handled by the data processing apparatus can be defined in the vector space. Similarly, the data processing apparatus may perform data detection operation as per the above-described threat detection operation as long as a distance between a plurality of tuples of data handled by the data processing apparatus can be defined in the vector space. Note that the data detection operation may include at least one of: processing of detecting neighbor data $DN_i$ corresponding to data located near query data DQ in the latent space; and processing of calculating an element contribution degree $c_{i,f}$ representing a magnitude of an effect that each vector component of a feature vector $XN_i$ of the neighbor data $DN_i$ exerts on a distance $d_i$ in the latent space between the query data DQ and the neighbor data $DN_i$. An example of such data handled by the data processing apparatus is at least one of data that can be formed into a list, data that can be formed into a database, and data that can be formed into a table.

Changes can be appropriately made to the present disclosure, within a scope where there arises no conflict with the gist or the idea of the invention that can be read from the claims and the entire specification, and an information processing apparatus, an information processing method, and a recording medium involving such changes are also included in the technical idea of the present disclosure.

DESCRIPTION OF REFERENCE CODES

SYS Communication system
1 Proxy server
2 Server
3 Client
4 Information processing apparatus
41 Storage apparatus
411 Proxy log DB
4111 Proxy log data
412 Feature dataset
413 Training dataset
4131 Training data
42 Computation apparatus
421 Feature extraction unit
422 Metric learning unit
423 Retrieval unit
424 Local model training unit
425 Contribution degree calculation unit
TM Transformation model
LM Local model
DQ Query data
DV Feature data
DN Neighbor data
XQ, XV, XN Feature vector
ZQ, ZV, ZN Latent vector

The invention claimed is:

1. An information processing apparatus comprising:
at least one memory storing configured to store instructions; and
at least one processor configured to execute the instructions to:
transform a plurality of tuples of feature vector data into a plurality of tuples of latent vector data, the plurality of tuples of feature vector data representing features of a plurality of sample data groups, respectively, in a presentation space, the plurality of tuples of latent vector data representing features of the plurality of sample data groups, respectively, in a latent space that is different from the presentation space, wherein the plurality of sample data groups are log data groups indicating an archival record of a communication relayed by a proxy server;
extract, based on the plurality of tuples of latent vector data, the plurality of tuples of feature vector data as a plurality of neighbor data, the extracted plurality of tuples of feature vector data each having a shorter distance from desired query data in the latent space than the plurality of tuples of feature vector data that were not extracted;
generate, based on the plurality of neighbor data, a local model that outputs an estimation value of a latent distance when difference information is inputted thereto, the latent distance being a distance between the query data and the plurality of neighbor data in the latent space, the difference information being related to a difference, for each element of the features, between the query data and the plurality of neighbor data in the presentation space;
calculate, based on the local model and the difference information, an element contribution degree representing a magnitude of an effect that each element of the features of each of the plurality of neighbor data exerts on the latent distance; and
output a list of the element contribution degrees for the plurality of neighbor data.

2. The information processing apparatus according to 1, wherein
at least one processor configured to execute the instructions to calculate the element contribution degree, based on a parameter defining the local model, and the difference information.

3. The information processing apparatus according to claim 2, wherein
the local model includes a linear regression model that uses the difference information for an explanatory variable, and uses the latent distance for an objective variable, and
the parameter includes a weight by which the explanatory variable is multiplied.

4. The information processing apparatus according to claim 3, wherein
the linear regression model does not include a bias term.

5. The information processing apparatus according to claim 3, wherein
the weight is equal to or more than zero.

6. The information processing apparatus according to claim 1, wherein
at least one processor configured to execute the instructions to generate the linear regression model represented by expression 1 where the number of elements of the features in each of the plurality of neighbor data and the query data is F (where F is a constant indicating an integer equal to or more than one), the difference information corresponding to a difference between a feature corresponding to an f-th (where f is a variable indicating an integer that satisfies $1 \leq f \leq F$) element in the neighbor data and a feature corresponding to an f-th element in the query data is $V_{i,f}$ a weight by which the difference information $V_{i,f}$ is multiplied is $w_f$, and the estimation value of the latent distance outputted by the local model is $dp_i$, and at least one processor configured to execute the instructions to calculate the element contribution degree by using expression 2 where the element contribution degree representing a magnitude of an effect that the feature corresponding to the f-th element in the neighbor data exerts on the latent distance is $c_{i,f}$, $$dp_i 3' \sum_{f=1}^{F} w_f \times v_{i,f} \quad \text{[Expression 1]}$$

$$c_{i,f} = \frac{w_f \times v_{i,f}}{dp_i} = \frac{w_f \times v_{i,f}}{\sum_{f'=1}^{F} w_{f'} \times v_{i,f'}}. \quad \text{[Expression 2]}$$

7. The information processing apparatus according to claim 1, wherein each element of the features indicated by the feature vector data is allowed to belong to at least one of a plurality of different feature groups, and at least one processor configured to execute the instructions to calculate, based on the element contribution degrees, a group contribution degree representing a magnitude of an effect that each feature group exerts on the latent distance.

8. The information processing apparatus according to claim 7, wherein the plurality of feature groups respectively correspond to a plurality of types of sample information included in the sample data groups, the information processing apparatus further comprises a display configured to display the sample data group, in a display form in which at least a part of the plurality of types of sample information included in the sample data group for which each of the plurality of neighbor data indicates the features is associated with the group contribution degrees.

9. An information processing method performed by a computer and comprising:

transforming a plurality of tuples of feature vector data into a plurality of tuples of latent vector data, the plurality of tuples of feature vector data representing features of a plurality of sample data groups, respectively, in a presentation space, the plurality of tuples of latent vector data representing features of the plurality of sample data groups, respectively, in a latent space that is different from the presentation space, wherein the plurality of sample data groups are log data groups indicating an archival record of a communication relayed by a proxy server;

extracting, based on the plurality of tuples of latent vector data, the plurality of tuples of feature vector data as a plurality of neighbor data, the at least one extracted plurality of tuples of feature vector data each having a shorter distance from desired query data in the latent space than the plurality of tuples of feature vector data that were not extracted;

generating, based on the plurality of neighbor data, a local model that outputs an estimation value of a latent distance when difference information is inputted thereto, the latent distance being a distance between the query data and the plurality of neighbor data in the latent space, the difference information being related to a difference, for each element of the features, between the query data and the plurality of neighbor data in the presentation space;

calculating, based on the local model and the difference information, an element contribution degree representing a magnitude of an effect that each element of the features of each of the plurality of neighbor data exerts on the latent distance; and outputting a list of the element contribution degrees for the plurality of neighbor data.

10. A non-transitory recording medium storing a computer program that executable by a computer to perform an information processing method comprising:

transforming a plurality of tuples of feature vector data into a plurality of tuples of latent vector data, the plurality of tuples of feature vector data representing features of a plurality of sample data groups, respectively, in a presentation space, the plurality of tuples of latent vector data representing features of the plurality of sample data groups, respectively, in a latent space that is different from the presentation space, wherein the plurality of sample data groups are log data groups indicating an archival record of a communication relayed by a proxy server;

extracting, based on the plurality of tuples of latent vector data, the plurality of tuples of feature vector data as a plurality of neighbor data, the at least one extracted plurality of tuples of feature vector data each having a shorter distance from desired query data in the latent space than the plurality of tuples of feature vector data that were not extracted;

generating, based on the plurality of neighbor data, a local model that outputs an estimation value of a latent distance when difference information is inputted thereto, the latent distance being a distance between the query data and the plurality of neighbor data in the latent space, the difference information being related to a difference, for each element of the features, between the query data and the plurality of neighbor data in the presentation space;

calculating, based on the local model and the difference information, an element contribution degree representing a magnitude of an effect that each element of the features of each of the plurality of neighbor data exerts on the latent distance; and outputting a list of the element contribution degrees for the plurality of neighbor data.

* * * * *